US011783742B2

(12) United States Patent
Ishihara et al.

(10) Patent No.: US 11,783,742 B2
(45) Date of Patent: Oct. 10, 2023

(54) DISPLAY DEVICE

(71) Applicant: Japan Display Inc., Tokyo (JP)

(72) Inventors: Tomoyuki Ishihara, Tokyo (JP); Tsutomu Harada, Tokyo (JP)

(73) Assignee: JAPAN DISPLAY INC., Tokyo (JP)

(*) Notice: Subject to any disclaimer, the term of this patent is extended or adjusted under 35 U.S.C. 154(b) by 0 days.

(21) Appl. No.: 17/747,510

(22) Filed: May 18, 2022

(65) Prior Publication Data

US 2022/0375377 A1 Nov. 24, 2022

(30) Foreign Application Priority Data

May 21, 2021 (JP) .................................. 2021-086185

(51) Int. Cl.
| | |
|---|---|
| *G09G 3/00* | (2006.01) |
| *G02F 1/1347* | (2006.01) |
| *G09G 3/36* | (2006.01) |
| *G09G 3/34* | (2006.01) |

(52) U.S. Cl.
CPC ............ *G09G 3/03* (2020.08); *G02F 1/1347* (2013.01); *G09G 3/3406* (2013.01); *G09G 3/3607* (2013.01); *G02F 2203/48* (2013.01); *G09G 2300/023* (2013.01); *G09G 2300/0452* (2013.01); *G09G 2320/0276* (2013.01)

(58) Field of Classification Search
CPC ...... G09G 3/03; G09G 3/3406; G09G 3/3607; G09G 2300/023; G09G 2300/0452; G09G 2320/0276; G09G 2320/0673; G02F 1/1347; G02F 2203/48
See application file for complete search history.

(56) References Cited

U.S. PATENT DOCUMENTS

| | | | | |
|---|---|---|---|---|
| 2010/0118006 A1* | 5/2010 | Kimura | ............... | G09G 3/3611 348/673 |
| 2014/0211112 A1* | 7/2014 | Yang | ...................... | G02B 30/31 359/463 |
| 2016/0180782 A1* | 6/2016 | Nakaya | ............... | G09G 3/3648 345/88 |
| 2017/0032744 A1* | 2/2017 | Yoo | ..................... | G09G 3/2007 |
| 2017/0343839 A1* | 11/2017 | Nam | ................... | G02F 1/13471 |
| 2018/0284546 A1* | 10/2018 | Tsuda | ............... | G02F 1/134309 |
| 2021/0142745 A1 | 5/2021 | Kimura et al. | | |

FOREIGN PATENT DOCUMENTS

WO   WO2019-225137 A1   11/2019

* cited by examiner

*Primary Examiner* — David Tung
(74) *Attorney, Agent, or Firm* — K&L Gates LLP

(57) ABSTRACT

A display device includes: a first panel comprising pixels; and a second panel having a plate surface provided substantially parallel to a plate surface of the first panel. The plate surface of each of the first and second panels includes a curved surface. When the curved surface is a convex portion and two pixels controlled to transmit the light through the first panel are located in the convex portion, a distance between centers of two predetermined regions to which a blurring processing is applied corresponding to the two pixels is set smaller than a distance between the two the pixels. When the curved surface is a concave portion and the two pixels controlled to transmit the light through the first panel are located in the concave portion, the distance between the centers of the two predetermined regions is set larger than the distance between the two the pixels.

5 Claims, 11 Drawing Sheets

| SPATIAL PROCESSING | FRONT VIEW | OBLIQUE VIEW | SCHEMATIC VIEW |
|---|---|---|---|
| NOT PERFORMED | NORMAL | DOUBLE IMAGE |  |
| FIRST COMPARATIVE EXAMPLE | THINNED | THINNED |  |
| SECOND COMPARATIVE EXAMPLE | HALOED | HALOED |  |
| EMBODIMENT | NORMAL | NORMAL |  |

DISPLAY DEVICE

CROSS-REFERENCE TO RELATED APPLICATION

This application claims the benefit of priority from Japanese Patent Application No. 2021-086185 filed on May 21, 2021, the entire contents of which are incorporated herein by reference.

BACKGROUND

1. Technical Field

What is disclosed herein relates to a display device.

2. Description of the Related Art

A configuration is known in which a dimming panel is provided between a liquid crystal display panel and a light source to increase contrast of an image (for example, International Application Publication No. WO2019/225137).

When the liquid crystal display panel has a curved surface, the dimming panel preferably also has a curved surface along the plate surface of the liquid crystal display panel. When positions of pixels that are controlled to transmit light through the liquid crystal display panel are simply applied as light-transmitting positions of the dimming panel, the positions of the pixels may be misaligned from the light-transmitting positions due to a difference between the curvature of the liquid crystal display panel and the curvature of the dimming panel.

For the foregoing reasons, there is a need for a display device that can obtain more appropriate light-transmitting positions of a dimming panel that is provided between a light source and a liquid crystal display panel having a curved surface and has a curved surface along the curved surface of the liquid crystal display panel.

SUMMARY

According to an aspect, a display device includes: a first panel comprising a plurality of pixels; and a second panel having a plate surface provided substantially in parallel with a plate surface of the first panel. The plate surface of the first panel and the plate surface of the second panel each include a curved surface. Blurring processing is configured to be applied to a dimming pixel of the second panel facing a pixel of the pixels that is controlled to transmit light through the first panel. In the blurring processing, based on a gradation value indicated by a pixel signal included in an externally received image signal, the dimming pixel arranged within a predetermined region located around a pixel of the pixels given the pixel signal is controlled to transmit light. When the curved surface is a convex portion and two pixels of the pixels that are controlled to transmit the light through the first panel are located in the convex portion, a distance between centers of two predetermined regions to which the blurring processing is applied corresponding to the two pixels is set smaller than a distance between the two pixels. When the curved surface is a concave portion and the two pixels that are controlled to transmit the light through the first panel are located in the concave portion, the distance between the centers of the two predetermined regions to which the blurring processing is applied corresponding to the two pixels is set larger than the distance between the two the pixels. A curvature of the first panel is smaller than a curvature of the second panel in the convex portion. The curvature of the first panel is larger than the curvature of the second panel in the concave portion.

According to an aspect, a display device includes: a first panel comprising a plurality of pixels; and a second panel having a plate surface provided substantially in parallel with a plate surface of the first panel. The plate surface of the first panel and the plate surface of the second panel each include a flat surface and a curved surface. Blurring processing is configured to be applied to a dimming pixel of the second panel facing a pixel of the pixels that is controlled to transmit light through the first panel. In the blurring processing, based on a gradation value indicated by a pixel signal included in an externally received image signal, the dimming pixel arranged within a predetermined region located around a pixel of the pixels given the pixel signal is controlled to transmit light. When the curved surface is a convex portion and one of two pixels that are included in the pixels and controlled to transmit the light through the first panel is located in the convex portion while another of the two pixels is located on the flat surface, a predetermined region facing the one of the two pixels is set larger than a predetermined region facing the other of the two pixels, in the two predetermined regions to which the blurring processing is applied corresponding to the two pixels. When the curved surface is a concave portion and the one of the two pixels that are controlled to transmit the light through the first panel is located in the concave portion while the other of the two pixels is located on the flat surface, the predetermined region facing the one of the two pixels is set smaller than the predetermined region facing the other of the two pixels, in the two predetermined regions to which the blurring processing is applied corresponding to the two pixels. A curvature of the first panel is smaller than a curvature of the second panel in the convex portion. The curvature of the first panel is larger than the curvature of the second panel in the concave portion.

DETAILED DESCRIPTION

Figure 1:
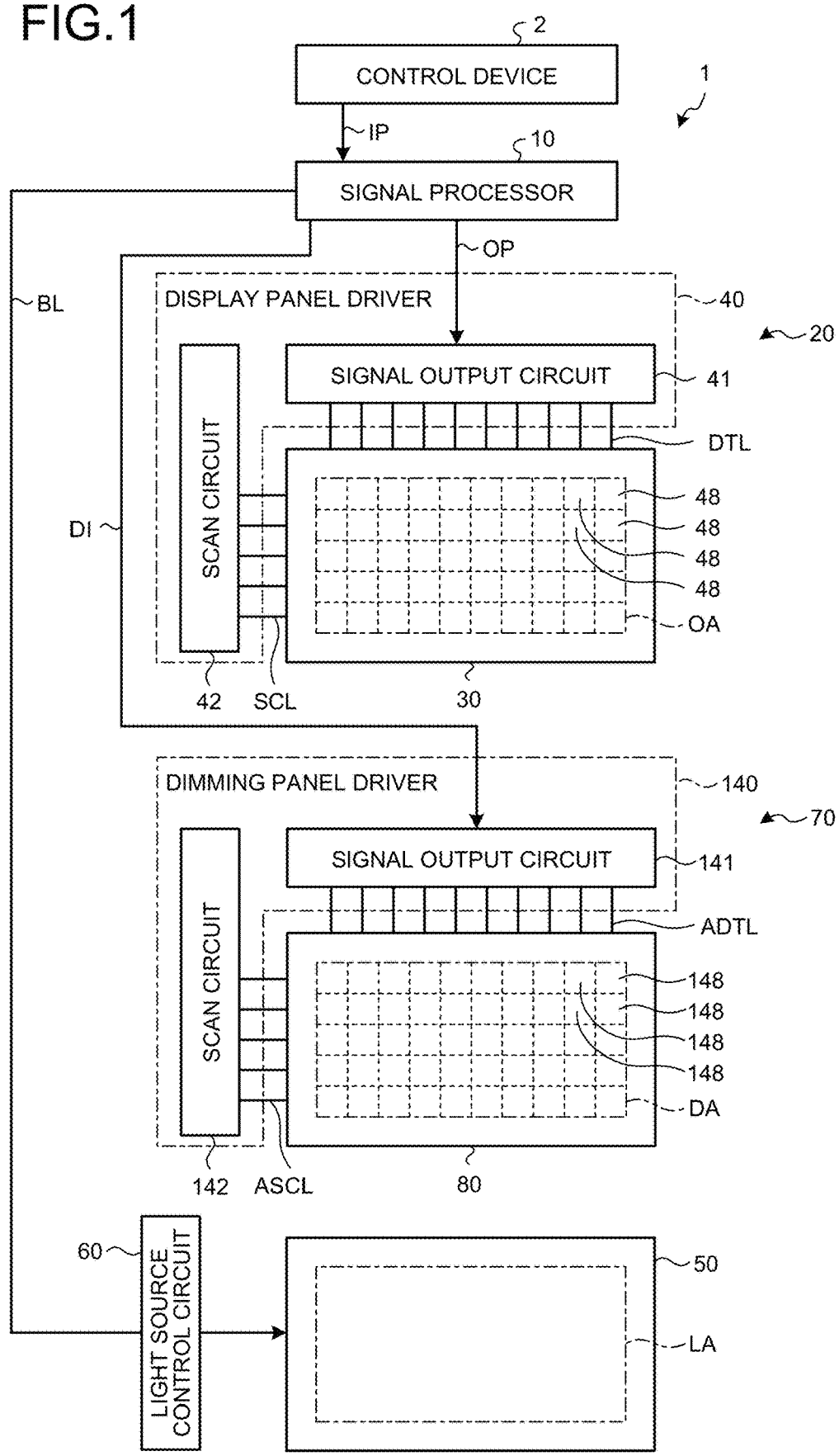
FIG. 1 is a diagram illustrating a main configuration example of a display device according to an embodiment.

The following describes an embodiment of the present disclosure with reference to the drawings. What is disclosed herein is merely an example, and the present disclosure naturally encompasses appropriate modifications easily conceivable by those skilled in the art while maintaining the gist of the invention. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

Embodiment

FIG. 1 is a diagram illustrating a main configuration example of a display device 1 according to the embodiment. The display device 1 of the embodiment includes a signal processor 10, a display part 20, a light source device 50, a light source control circuit 60, and a dimmer (light dimming part) 70. The signal processor 10 performs various types of output based on an input signal IP received from an external control device 2, and thus controls operations of the display part 20, the light source device 50, and the dimmer 70. The input signal IP is a signal serving as data for outputting an image to be displayed on the display device 1, and is, for example, a red-green-blue (RGB) image signal. The signal processor 10 outputs, to the display part 20, an output image signal OP generated based on the input signal IP. The signal processor 10 also outputs, to the dimmer 70, a dimming signal DI generated based on the input signal IP. After receiving the input signal IP, the signal processor 10 outputs, to the light source control circuit 60, a light source drive signal BL for controlling lighting of the light source device 50. The light source control circuit 60 is, for example, a driver circuit of the light source device 50, and operates the light source device 50 in response to the light source drive signal BL. The light source device 50 includes a light source that emits light from a light-emitting surface LA. In the embodiment, the light source control circuit 60 operates the light source device 50 so as to emit a constant amount of light from the light-emitting surface LA of the light source device 50 in accordance with display timing of a frame image.

The display part 20 includes a display panel 30 and a display panel driver 40. The display panel 30 has a display area OA provided with a plurality of pixels 48. The pixels 48 are arranged, for example, in a matrix having a row-column configuration. The display panel 30 of the embodiment is a liquid crystal image display panel. The display panel driver 40 includes a signal output circuit 41 and a scan circuit 42. The signal output circuit 41 is a circuit serving as what is called a source driver, and drives the pixels 48 in accordance with the output image signal OP. The scan circuit 42 is a circuit serving as what is called a gate driver and outputs a drive signal for scanning the pixels 48 arranged in a matrix in units of a predetermined number of rows (for example, in units of one row). The pixels 48 are driven so as to output gradation values corresponding to the output image signal OP at the timing of the output of the drive signal.

The dimmer 70 adjusts the amount of light that is emitted from the light source device 50 and is output through the display area OA. The dimmer 70 includes a dimming panel 80 and a dimming panel driver 140. The dimming panel 80 has a dimming area DA provided so as to be capable of varying transmittance of light. The dimming area DA is disposed in a position overlapping the display area OA when the display area OA is viewed in a plan view. The dimming area DA covers the entire display area OA in the plan view. The light-emitting surface LA covers the entire display area OA and the entire dimming area DA in the plan view.

Figure 2:
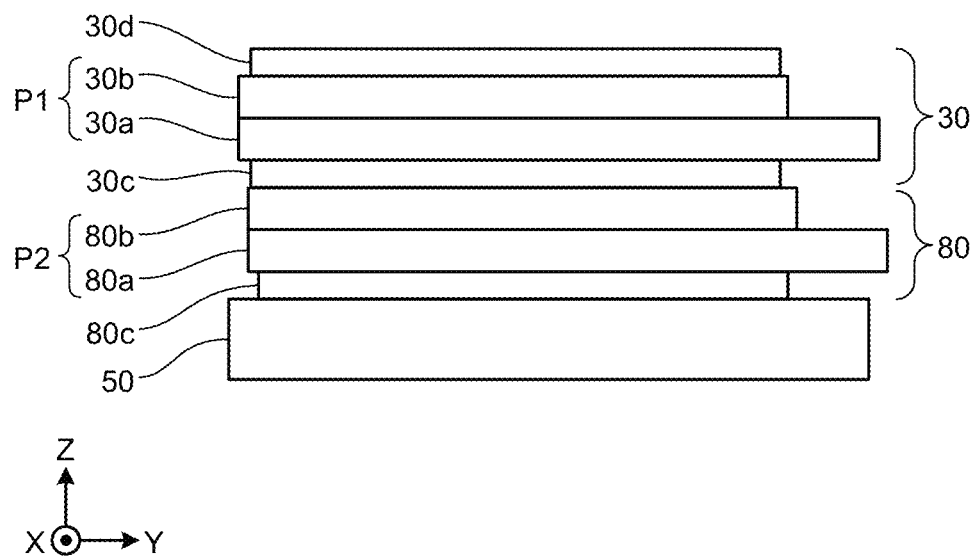
FIG. 2 is a diagram illustrating an exemplary positional relation between an image display panel, a dimming panel, and a light source device.

FIG. 2 is a diagram illustrating an exemplary positional relation between the display panel 30, the dimming panel 80, and the light source device 50. In the embodiment, the display panel 30, the dimming panel 80, and the light source device 50 are stacked as illustrated in FIG. 2. Specifically, the dimming panel 80 is stacked on a light-emitting surface side of the light source device 50 from which the light is emitted. The display panel 30 is stacked on a side opposite to the light source device 50 with the dimming panel 80 interposed therebetween. The light emitted from the light source device 50, the amount of which is adjusted by the dimming area DA of the dimming panel 80, illuminates the display panel 30. The display panel 30 is illuminated from a back surface side thereof where the light source device 50 is located, and outputs the image for display to a side (display surface side) opposite to the back surface side. In this manner, the light source device 50 serves as a backlight that illuminates the display area OA of the display panel 30 from the back surface thereof. In the embodiment, the dimming panel 80 is provided between the display panel 30 and the light source device 50. Hereinafter, a Z-direction refers to a direction in which the display panel 30, the dimming panel 80, and the light source device 50 are stacked. An X-direction and a Y-direction refer to two directions orthogonal to the Z-direction. The X-direction is orthogonal to the Y-direction. The pixels 48 are arranged in a matrix along the X-direction and the Y-direction.

The display panel 30 includes an array substrate 30a and a counter substrate 30b that is located on a display surface side of the array substrate 30a and faces the array substrate 30a. As will be described later, a liquid crystal layer LC1 is disposed between the array substrate 30a and the counter substrate 30b (refer to FIG. 5). A polarizing plate 30c is provided on a back surface side of the array substrate 30a. A polarizing plate 30d is provided on a display surface side of the counter substrate 30b. The dimming panel 80 includes a first substrate 80a and a second substrate 80b that is located on a display surface side of the first substrate 80a and faces the first substrate 80a. As will be described later, a liquid crystal layer that is the same as the liquid crystal layer LC1 is disposed between the first substrate 80*a* and the second substrate 80*b*. A polarizing plate 80*c* is provided on a back surface side of the first substrate 80*a*. The polarizing plate 30*c* polarizes light both on the back surface side of the display panel 30 and on a display surface side of the dimming panel 80.

Hereinafter, a first panel P1 denotes a component that includes the array substrate 30*a* and the counter substrate 30*b*, and in addition, the liquid crystal layer LC1 interposed between the array substrate 30*a* and the counter substrate 30*b*. The first panel P1 naturally also includes non-illustrated components stacked on the array substrate 30*a* and the counter substrate 30*b*. A second panel P2 denotes a component that includes the first and the second substrates 80*a* and 80*b* and the liquid crystal layer LC1 interposed between the first and the second substrates 80*a* and 80*b*. The second panel P2 naturally also includes non-illustrated components stacked on the first and the second substrates 80*a* and 80*b*.

Figure 3:
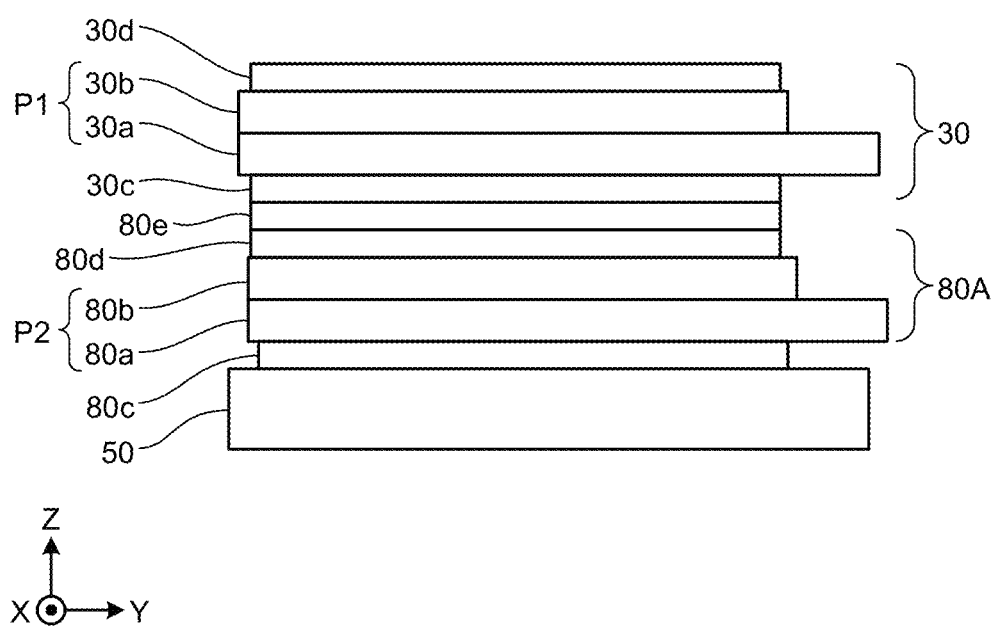
FIG. 3 is a diagram illustrating an example in which a polarizing plate is provided on a display surface side of the dimming panel.

FIG. 3 is a diagram illustrating an example in which a polarizing plate 80*d* is provided on the display surface side of a dimming panel 80A. As illustrated in FIG. 3, the polarizing plate 80*d* may be provided on a display surface side of the second substrate 80*b*. As illustrated in FIG. 3, a diffusion layer 80*e* for diffusing light may be interposed between the polarizing plate 30*c* and the polarizing plate 80*d*.

Figure 4:
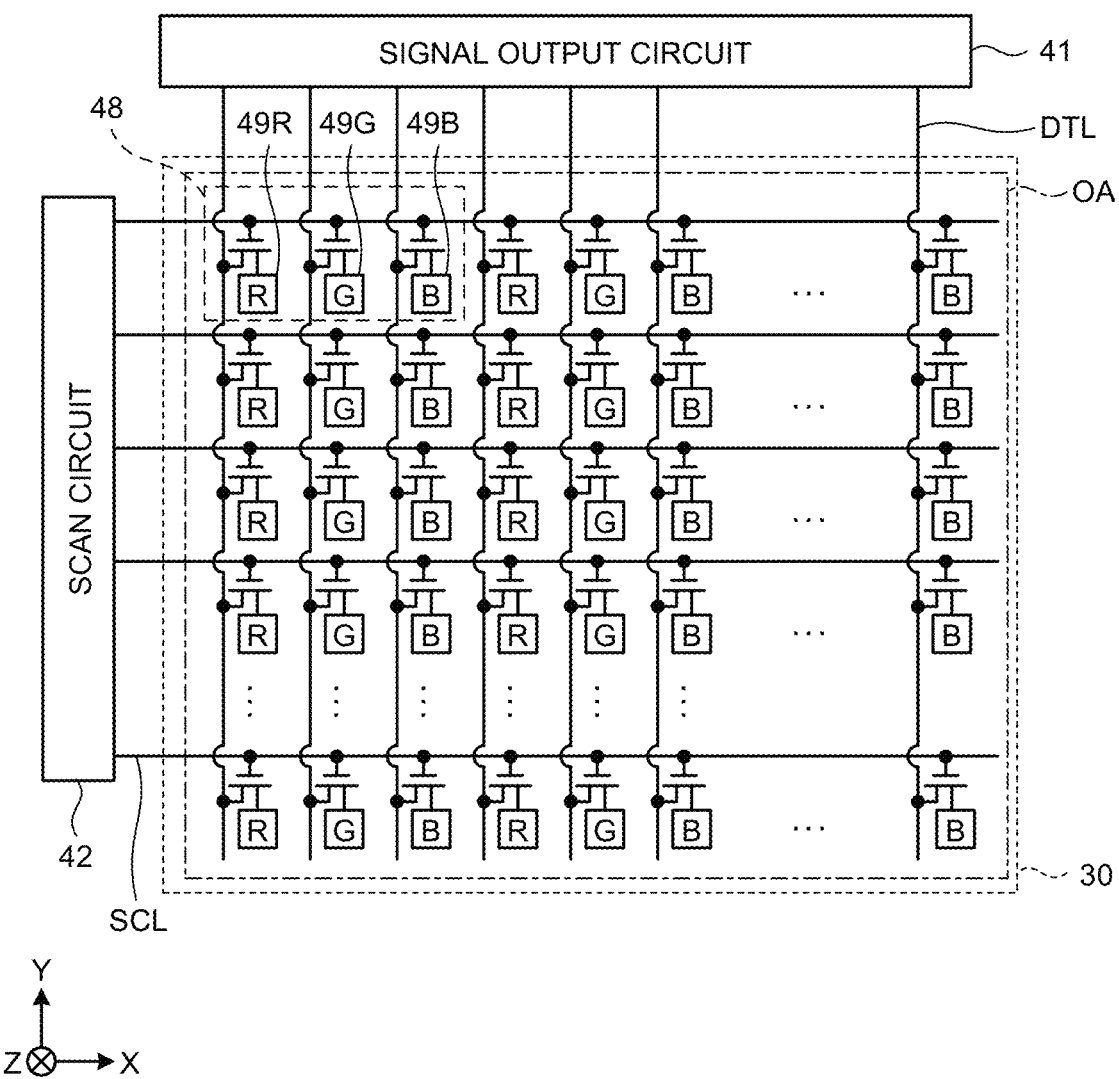
FIG. 4 is a diagram illustrating an exemplary pixel array of the image display panel.

FIG. 4 is a diagram illustrating an exemplary pixel array of the display panel 30. As illustrated in FIG. 4, each of the pixels 48 includes, for example, a first sub-pixel 49R, a second sub-pixel 49G, and a third sub-pixel 49B. The first sub-pixel 49R displays a first primary color (for example, red). The second sub-pixel 49G displays a second primary color (for example, green). The third sub-pixel 49B displays a third primary color (for example, blue). In this manner, each of the pixels 48 arranged in a matrix on the display panel 30 includes the first sub-pixel 49R for displaying a first color, the second sub-pixel 49G for displaying a second color, and the third sub-pixel 49B for displaying a third color. The first color, the second color, and the third color are not limited to the first primary color, the second primary color, and the third primary color, but only need to be different colors from one another, such as complementary colors. In the following description, the first sub-pixel 49R, the second sub-pixel 49G, and the third sub-pixel 49B will be each called a sub-pixel 49 when they need not be distinguished from one another.

The pixel 48 may further include another sub-pixel 49 in addition to the first sub-pixel 49R, the second sub-pixel 49G, and the third sub-pixel 49B. For example, the pixel 48 may include a fourth sub-pixel for displaying a fourth color. The fourth sub-pixel displays a fourth color (for example, white). The fourth sub-pixel is preferably brighter than the first sub-pixel 49R for displaying the first color, the second sub-pixel 49G for displaying the second color, and the third sub-pixel 49B for displaying the third color, when they are irradiated with the same light source lighting amount.

The display device 1 is more specifically a transmissive color liquid crystal display device. As illustrated in FIG. 4, the display panel 30 is a color liquid crystal display panel, in which a first color filter for transmitting light in the first primary color is disposed between the first sub-pixel 49R and an image viewer, a second color filter for transmitting light in the second primary color is disposed between the second sub-pixel 49G and the image viewer, and a third color filter for transmitting light in the third primary color is disposed between the third sub-pixel 49B and the image viewer. The first color filter, the second color filter, and the third color filter are components included in a filter film 26 described later.

When the fourth sub-pixel is provided, no color filter is disposed between the fourth sub-pixel and the image viewer. In this case, a large level difference in height is generated at the fourth sub-pixel. Therefore, a transparent resin layer instead of the color filter may be provided on the fourth sub-pixel. This configuration can restrain the generation of the large level difference in height at the fourth sub-pixel.

The signal output circuit 41 is electrically coupled to the display panel 30 through signal lines DTL. The display panel driver 40 uses the scan circuit 42 to select the sub-pixel 49 on the display panel 30 and to control ON and OFF of a switching element (such as a thin-film transistor (TFT)) for controlling operation (light transmittance) of the sub-pixel 49. The scan circuit 42 is electrically coupled to the display panel 30 through scan lines SCL.

In the embodiment, the signal lines DTL are arranged in the X-direction. Each of the signal lines DTL extends in the Y-direction. The scan lines SCL are arranged in the Y-direction. Each of the scan lines SCL extends in the X-direction. Thus, in the embodiment, in response to the drive signal output from the scan circuit 42, the pixels 48 are driven for each pixel row (line) including a plurality of the pixels 48 that are arranged in the X-direction so as to share the scan line SCL. Hereinafter, a simple notation of "line" refers to a pixel row including the pixels 48 that are arranged in the X-direction so as to share the scan line SCL.

The term "horizontal scan direction" refers to a direction along the extending direction of each of the scan lines SCL. The term "vertical scan direction" refers to the arrangement direction of the scan lines SCL. In the embodiment, the X-direction corresponds to the horizontal scan direction, and the Y-direction corresponds to the vertical scan direction.

Figure 5:
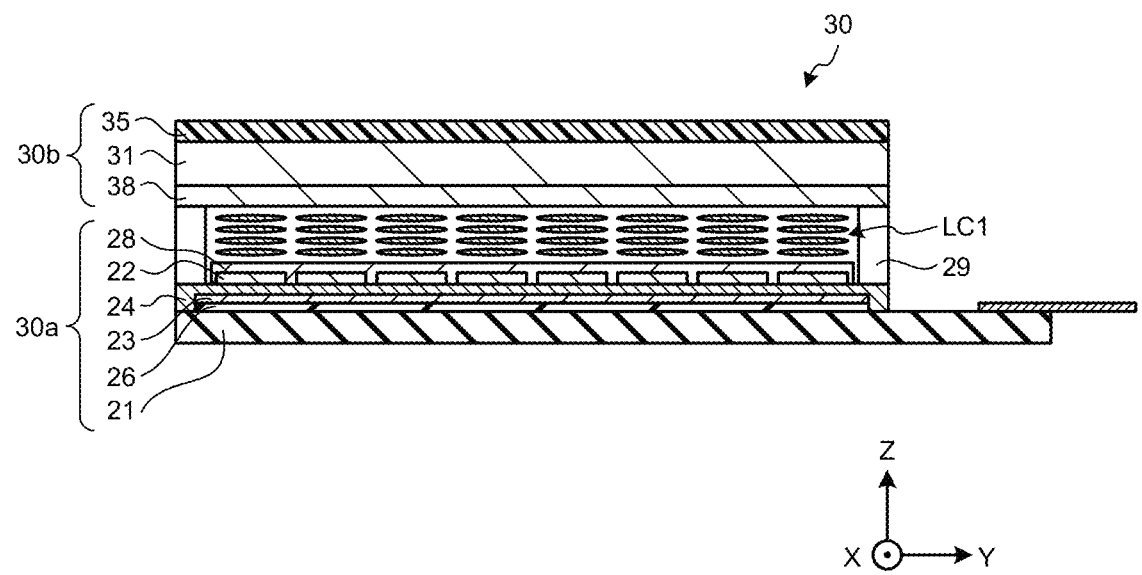
FIG. 5 is a sectional view illustrating an exemplary schematic sectional structure of the image display panel.

FIG. 5 is a sectional view illustrating an exemplary schematic sectional structure of the display panel 30. The array substrate 30*a* includes the filter film 26 provided on the upper side of a pixel substrate 21 such as a glass substrate, a counter electrode 23 provided on the upper side of the filter film 26, an insulating film 24 provided on the upper side of the counter electrode 23 so as to be in contact therewith, pixel electrodes 22 on the upper side of the insulating film 24, and a first orientation film 28 provided on the uppermost surface side of the array substrate 30*a*. The counter substrate 30*b* includes a counter pixel substrate 31 such as a glass substrate, a second orientation film 38 provided on the lower surface of the counter pixel substrate 31, and a polarizing plate 35 provided on the upper surface thereof. The array substrate 30*a* is fixed to the counter substrate 30*b* with a sealing part 29 interposed therebetween. The liquid crystal layer LC1 is sealed in a space surrounded by the array substrate 30*a*, the counter substrate 30*b*, and the sealing part 29. The liquid crystal layer LC1 contains liquid crystal molecules that change in orientation direction depending on an electric field applied thereto. The liquid crystal layer LC1 modulates light passing through the inside of the liquid crystal layer LC1 depending on the state of the electric field. The electric field applied between the pixel electrodes 22 and the counter electrode 23 changes the orientations of the liquid crystal molecules of the liquid crystal layer LC1, and thus changes the transmission amount of the light passing through the liquid crystal layer LC1. The sub-pixels 49 include the respective pixel electrodes 22. The switching elements for individually controlling the operation (light transmittance) of the sub-pixels 49 are electrically coupled to the pixel electrodes 22.

The dimmer 70 includes the dimming panel 80 and the dimming panel driver 140. The dimming panel 80 of the embodiment has the same configuration as that of the display panel 30 illustrated in FIG. 5 except that the filter film 26 is not included. Thus, the dimming panel 80 includes dimming pixels 148 including the sub-pixels 49 not provided with the color filters (refer to FIG. 1) instead of the pixels 48 including the first sub-pixels 49R, the second sub-pixels 49G, and the third sub-pixels 49B distinguished by the colors of the color filters (refer to FIG. 4). That is, the dimming panel 80 is a monochrome liquid crystal panel.

A signal output circuit 141 and a scan circuit 142 included in the dimming panel driver 140 have the same configurations as those of the signal output circuit and the scan circuit of the display panel driver 40 except that the signal output circuit 141 and the scan circuit 142 are coupled to the dimming panel 80. Signal lines ADTL between the dimming panel 80 and the dimming panel driver 140 illustrated in FIG. 1 have the same configuration as that of the signal lines DTL described with reference to FIG. 4. Scan lines ASCL between the dimming panel 80 and the dimming panel driver 140 illustrated in FIG. 1 have the same configuration as that of the scan lines SCL described with reference to FIG. 4.

In the embodiment, the arrangement of the pixels 48 in the display area OA is the same as the arrangement of the dimming pixels 148 in the dimming area DA. Consequently, in the embodiment, the number of the pixels 48 arranged in the X-direction of the display area OA is the same as the number of the dimming pixels 148 arranged in the X-direction of the dimming area DA. In the embodiment, the number of the pixels 48 arranged in the Y-direction of the display area OA is the same as the number of the dimming pixels 148 arranged in the Y-direction of the dimming area DA. In the embodiment, the display area OA overlaps the dimming area DA in an XY-plane view. The Z-direction corresponds to an optical axis LL (refer to FIG. 7) of the light emitted from the light-emitting surface LA of the light source device 50. Thus, an optical axis (optical axis LL) of light passing through one of the pixels 48 coincides with an optical axis of light passing through one of the dimming pixels 148 that is located in a position overlapping the pixel 48 in the XY-plane view. However, the light emitted from the light-emitting surface LA is radially diffused incoherent light. Therefore, light rays in directions not along the optical axis LL may also enter the dimming pixels 148 and the pixels 48.

Figure 6:
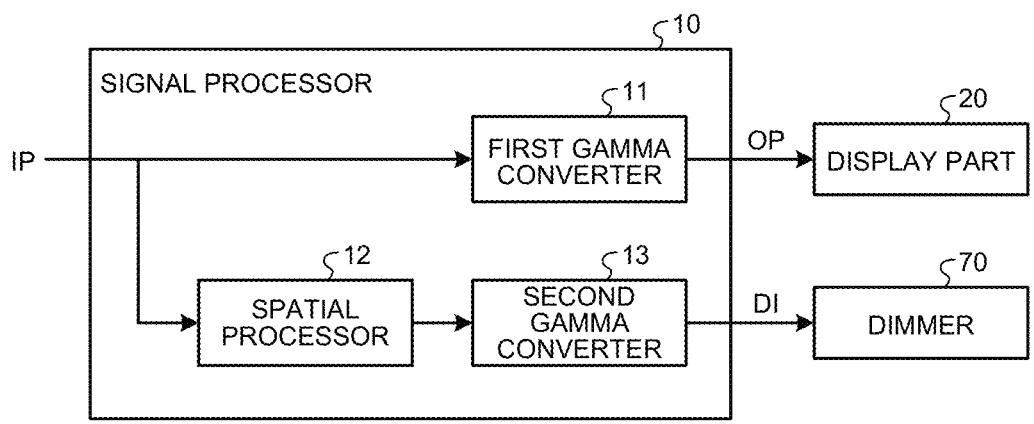
FIG. 6 is a block diagram illustrating a functional configuration example of a signal processor.

FIG. 6 is a block diagram illustrating a functional configuration example of the signal processor 10. The signal processor 10 includes a first gamma converter 11, a spatial processor 12, and a second gamma converter 13.

When gamma correction is required in obtaining an output value from an input value, the first gamma converter 11 performs gamma correction processing. The input value herein is an RGB gradation value of each of the pixels included in the frame image represented by the input signal IP. The output value is brightness of the pixel 48 recognized by a user viewing the display area OA when the pixel 48 included in the display panel 30 is controlled at a voltage corresponding to the input value. In the embodiment, an appropriate value of the output value is assumed to be obtained by controlling the pixel 48 in accordance with the input value from the viewpoint of a one-to-one relation between the RGB gradation value and each of the pixels 48, so that no particular correction is performed. However, depending on the gamma characteristics of the display panel 30, the first gamma converter 11 performs the gamma correction processing.

In the embodiment, as described above regarding the first gamma converter 11, the RGB gradation value (input value) indicated by pixel data given to the pixel 48 at a certain position by the input signal IP corresponding to one frame image is the same as the RGB gradation value (output value) indicated by the pixel data given to the pixel 48 by the output image signal OP based on the input signal IP. Thus, when Ic denotes the input value and g0(Ic) denotes the output value, an expression Ic=g0(Ic) holds. g0(Ic) can be represented in the form of the RGB gradation value, that is, (R, G, B)=($\alpha$, $\beta$, $\gamma$). $\alpha$, $\beta$, and $\gamma$ are numerical values each corresponding to the number of bits of information indicating the gradation value. For example, in the case of eight bits, each of $\alpha$, $\beta$, and $\gamma$ takes a value within a range from 0 to 255.

The second gamma converter 13 illustrated in FIG. 6 performs the gamma correction processing when the gamma correction is required for a dimming gradation value. In the embodiment, the second gamma converter 13 performs the gamma correction processing such that a gamma curve between a case where both the dimming panel 80 and the display panel 30 are at the lowest gradation (0) and a case where both the dimming panel 80 and the display panel 30 are at the highest gradation (255 in the case of eight bits) is a desired gamma curve (for example, a gamma curve corresponding to a gamma value of 2.2). When g1 denotes a coefficient used in the gamma correction, the dimming gradation value after the gamma correction processing is performed by the second gamma converter 13 can be represented as $g1(Ic_{max}+A)$.

Figure 7:
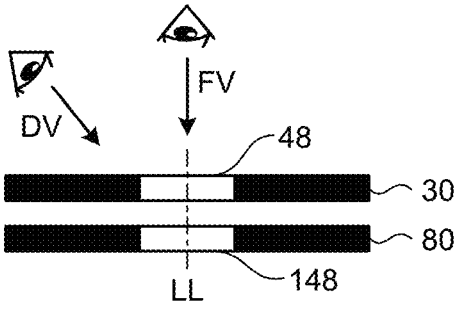
FIG. 7 is a diagram illustrating relations between types of spatial processing, states of an image viewed in a front view and an oblique view, and schematic diagrams illustrating outlines of the spatial processing.
Figure 7:
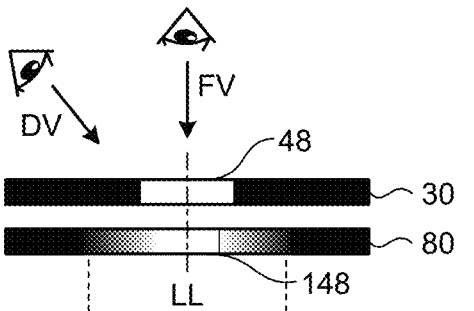
Figure 7:
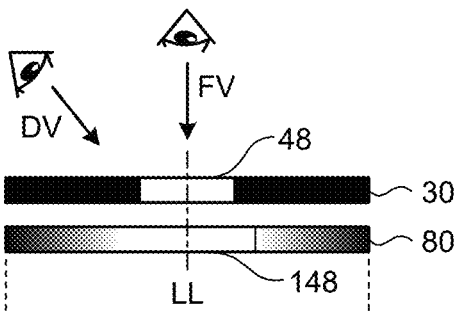
Figure 7:
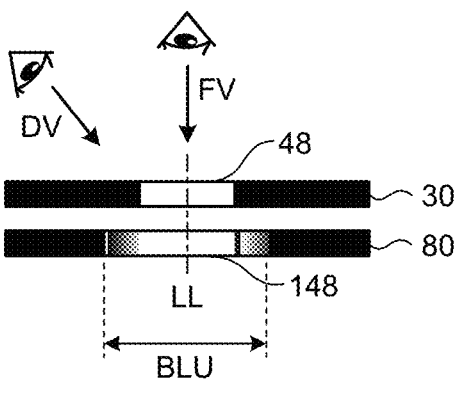

The first gamma converter 11 illustrated in FIG. 6 outputs the output image signal OP to the display panel 30. The output image signal OP is a set of the values g0(Ic) described above for the respective pixels 48. Each of the pixels 48 is driven in accordance with the value g0(Ic) by operation of the display panel driver 40. The second gamma converter 13 outputs the dimming signal DI to the dimming panel 80. The dimming signal DI is a set of the values $g1(Ic_{max}+A)$ described above for the respective dimming pixels 148. Each of the dimming pixels 148 is driven in accordance with the value $g1(Ic_{max}+A)$ by operation of the dimming panel driver 140. That is, the dimming panel 80 operates such that the degree of transmission of the light through each of the dimming pixels 148 corresponds to the dimming gradation value thereof. In the embodiment, all the sub-pixels 49 included in one of the dimming pixels 148 are driven such that each of the sub-pixels 49 has a degree of transmission of light corresponding to the dimming gradation value of the one of the dimming pixels 148. As a result, the frame image corresponding to the input signal IP is displayed in the display area OA, and the dimming pixels 148 subjected to the spatial processing of the "embodiment" described with reference to FIG. 7 is controlled. Thus, the user can view the frame image corresponding to the input signal IP with sufficient accuracy in both a front view FV and an oblique view DV.

The spatial processor 12 performs spatial processing. The spatial processing refers to processing to determine a dimming gradation value to be applied to the dimming pixel 148 based on the input value for one of the pixels 48 transmitting light having the optical axis LL that coincides with an optical axis of the light passing through the dimming pixel 148 and input values for the other pixels 48 arranged around the one of the pixels 48. The dimming gradation value is a value indicating a degree of transmission of light through the dimming pixel 148. That is, the voltage of a signal supplied from the signal output circuit 141 to control the orientation of a liquid crystal layer (having the same configuration as that of the liquid crystal layer LC1 illustrated in FIG. 5) included in the dimming pixel 148 corresponds to the dimming gradation value.

FIG. 7 is a diagram illustrating relations between types of the spatial processing, states of an image viewed in the front view FV and the oblique view DV, and schematic diagrams illustrating outlines of the spatial processing. In each of the schematic diagrams of FIG. 7, the front view FV and the oblique view DV are indicated by a position of an eye and an angle of a line of sight to the display panel 30.

First, the following describes a case where the spatial processing is not performed, that is, the "spatial processing" in FIG. 7 is "not performed". The case where the spatial processing is not performed refers to a case where the dimming gradation value applied to the dimming pixel 148 corresponds only to the input value for the pixel 48 transmitting light having the optical axis LL that coincides with an optical axis of the light passing through the dimming pixel 148. In this case, the image is normally recognized in the front view FV. However, in the oblique view DV, parallax occurs between an image viewed by the right eye and an image viewed by the left eye due to mismatch between the line of sight and the optical axis LL, which is a common optical axis for both the pixel 48 and the dimming pixel 148. This parallax causes the user viewing the display panel 30 at an angle of the oblique view DV to recognize the image as a double image.

Therefore, when the pixel 48 is controlled to transmit light corresponding to an RGB gradation value larger than zero, a certain amount of light is made to be transmitted not only through the dimming pixel 148 transmitting light having the optical axis LL that coincides with an optical axis of light passing through the pixel 48, but also through the other dimming pixels 148 located around the dimming pixel 148. That is, the dimming panel driver 140 controls the other dimming pixels 148 such that the light is transmitted based on not only "the optical axis LL of the pixel 48 and the dimming pixel 148 with respect to the front view FV", but also the input values for the other pixels 48 arranged around the pixel 48. This operation can restrain the recognition of the double image in the oblique view DV that would occur when the spatial processing is not performed.

However, as in the case where the "spatial processing" is a "first comparative example" in FIG. 7, when the region in which the dimming pixels 148 transmit the light is insufficient with respect to an angle of the front view FV and the oblique view DV with respect to the pixels 48 transmitting the light, thinning occurs in which a line drawn by dots of an image viewed by lighting the pixels 48 on the display panel 30 looks thinner.

As in the case where the "spatial processing" is "second comparative example" in FIG. 7, when the region in which the dimming pixels 148 transmit the light is unnecessarily large with respect to the angle of the front view FV and the oblique view DV with respect to the pixels 48 transmitting the light, the image viewed by lighting the pixels 48 on the display panel 30 is viewed as if a halo appears. As described above, the display quality has room for improvement when the "spatial processing" is "not performed", the "first comparative example", or the "second comparative example".

Therefore, in the embodiment, the degree of transmission of light of each of the dimming pixels 148 is controlled taking into account the gradation value of each of the pixels 48 and viewing angle characteristics of the display panel 30. This control can reduce the occurrence of the states of, for example, the "first comparative example" and the "second comparative example" in FIG. 7. That is, as in the case where "spatial processing" is the "embodiment" in FIG. 7, the normal image can be viewed in the front view FV and the oblique view DV. FIG. 7 schematically illustrates that a blurring region BLU according to the embodiment allows the normal image to be viewed both in the front view FV and in the oblique view DV. In the blurring processing corresponding to the pixel 48 that is controlled so as to transmit light based on the input signal IP, the blurring region BLU is a region in which, in order to control the operation of the dimming pixels 148 so as to transmit the light reaching the pixel 48, the dimming pixels 148 that are included in the dimming pixels 148 arranged around the pixel 48 in the plane view and are increased in the dimming gradation value (degree of transmission of light) by a positive amount by the blurring processing are arranged. Therefore, even if the blurring processing is performed on the dimming pixels 148 located outside the blurring region BLU, the dimming gradation value (degree of transmission of light) is naturally not increased by a positive amount (increased by zero amount) by the blurring processing. That is, the boundary line for distinguishing between the inside and the outside of the blurring region BLU is determined by whether the dimming gradation value (degree of transmission of light) is increased by a positive amount. The positive amount is added to the dimming gradation value (degree of transmission of light) by the blurring processing. The blurring processing is performed corresponding to the pixel 48 that is controlled so as to transmit light based on the input signal IP.

The term "viewing angle" refers to an angular range in which the user viewing display output of the display device 1 can sufficiently recognize a luminance difference of the pixels 48 that is controlled so as to be lit at different degrees of luminance, as a difference in contrast. A reference angle (zero degrees) in the viewing angle refers to a case where the user views the display area OA from a position in the Z-direction (right in front) of the display area OA. The viewing angle characteristics is determined depending on, for example, a driving method of liquid crystals employed for the display panel 30. The viewing angle characteristics include not only the degree of the viewing angle but also characteristics regarding the contrast of the display output. More specifically, the viewing angle characteristics is a relation between the position/angle of a user viewing the display area OA with respect to the display area OA and the recognition of the contrast of the display output (image) in the display area OA recognized by the user. The user is a user recognizing the display area OA. The relation therebetween is generated by a relation between the luminance difference among the pixels 48 recognized by the user when the user located in a position shifted from the front side of the display area OA and the difference in contrast among the pixels 48 recognized by the user.

Figure 8:
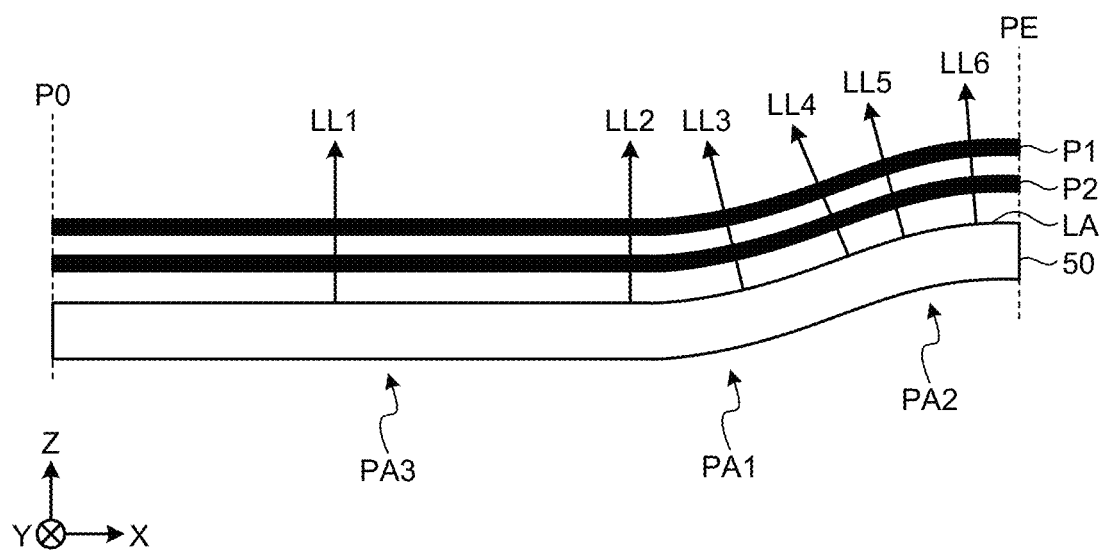
FIG. 8 is a view illustrating an exemplary sectional shape of a first panel, a second panel, and the light source device.

FIG. 8 is a view illustrating an exemplary sectional shape of the first panel P1, the second panel P2, and the light source device 50. As illustrated in FIG. 8, the sectional shape, which is orthogonal to the Y-direction, of the first panel P1, the second panel P2, and the light source device 50 includes a curved shape. FIG. 8 illustrates the sectional shape that includes a concave portion PA1 where the first panel P1 looks recessed and a convex portion PA2 where the first panel P1 looks raised to the user viewing the first panel P1 side. FIG. 8 further includes a flat surface portion PA3 where the first panel P1, the second panel P2, and the light source device 50 are along a plane orthogonal to the Z-direction.

FIG. 8 illustrates an example where the flat surface portion PA3, the concave portion PA1, and the convex portion PA2 are arranged in this order from one end P0 toward another end PE in the X-direction. Thus, from the point of view of the user viewing the first panel P1, the flat surface portion PA3 on the one end P0 side of the concave portion PA1 is recognized as a structure relatively recessed with respect to the convex portion PA2 on the other end PE side of the concave portion PA1. However, the sectional shape of the first panel P1, the second panel P2, and the light source device 50 is not limited to this shape. As a different example, the relative positional relation of the concave portion PA1 and the convex portion PA2 may be reversed. In that case, the flat surface portion PA3 is recognized as a structure relatively raised with respect to the concave portion PA1 on the other end PE side of the convex portion PA2. The sectional shape may be such that the structure according to the example illustrated in FIG. 8 or the above-described different example is line-symmetric in the X-direction with respect to the one end P0 or the other end PE serving as the center in the X-direction.

Optical axes LL1, LL2, LL3, LL4, LL5, and LL6 of the light emitted by the light source device 50 are along lines normal to a light-emitting surface of the light source device 50. Thus, the optical axes LL1 and LL2 of the light emitted from the light source device 50 within a region where the light-emitting surface is orthogonal to the Z-direction are along the Z-direction. The optical axes LL3, LL4, LL5, and LL6 of the light emitted from the light source device 50 within a region where the light-emitting surface is not orthogonal to the Z-direction intersect the X-, Y-, and Z-directions.

In the Z-direction in the plan view, the pixel 48 illuminated by the light emitted from the light source device 50 within the region where the light-emitting surface of the light source device 50 is not orthogonal to the Z-direction does not overlap the dimming pixel 148 transmitting light having an optical axis that coincides with the optical axis (for example, any one of the optical axes LL3, LL4, LL5, and LL6) of light passing through the pixel 48. Therefore, in the embodiment, coordinate management is performed considering the positional relation between the pixel 48 illuminated by the light emitted from the light source device 50 within the region where the light-emitting surface of the light source device 50 is not orthogonal to the Z-direction and the dimming pixel 148 transmitting light having an optical axis that coincides with the optical axis of light passing through the pixel 48. The following describes the concept of the positional relation between the pixel 48 and the dimming pixel 148, including the coordinate management, with reference to FIG. 9.

Figure 9:
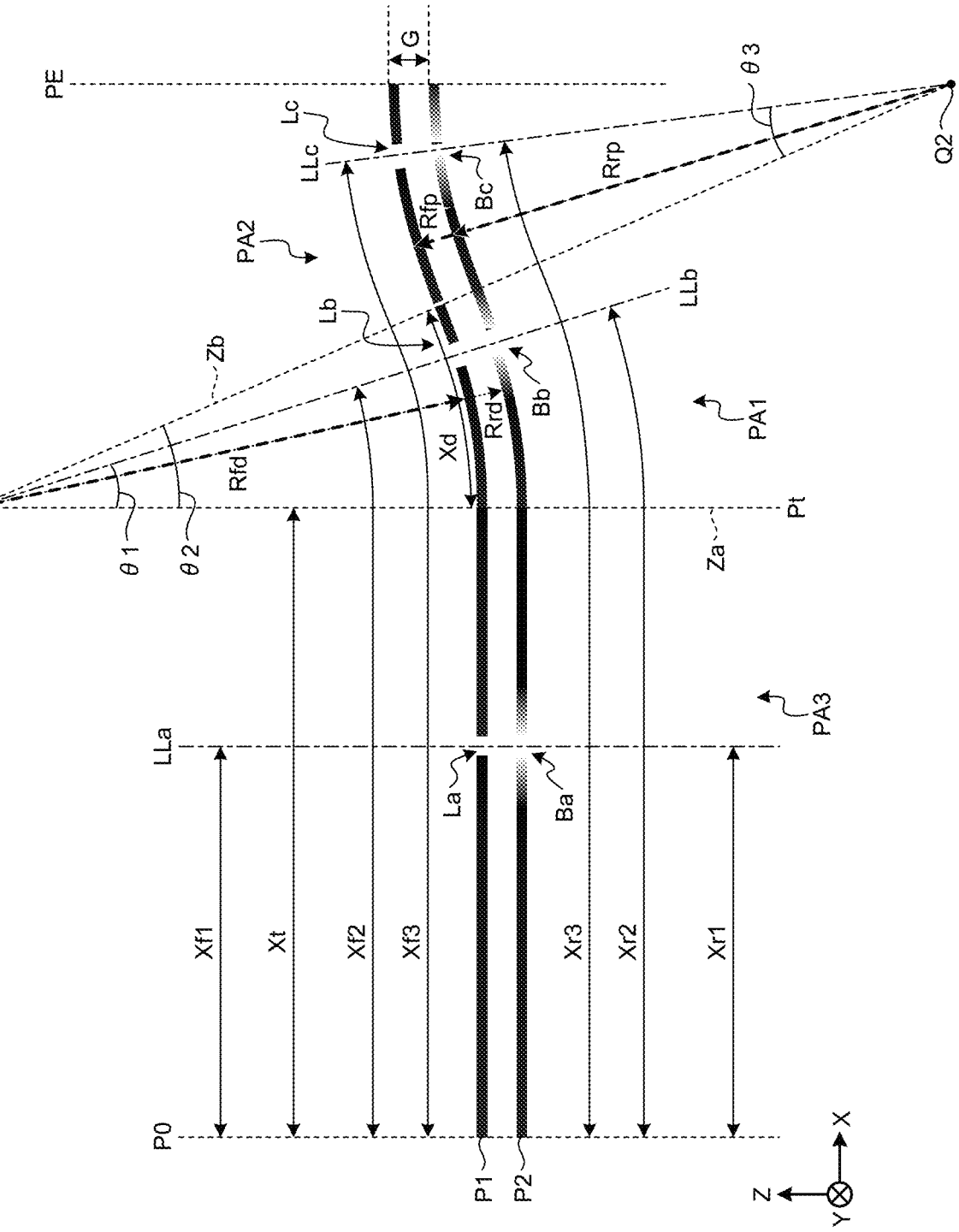
FIG. 9 is a schematic diagram illustrating a positional relation between a pixel that transmits light and a dimming pixel that transmits light having an optical axis that coincides with an optical axis of the light passing through the pixel.

FIG. 9 is a schematic diagram illustrating the positional relation between the pixel 48 that transmits light and the dimming pixel 148 that transmits light having the optical axis that coincides with the optical axis of the light passing through the pixel. Coordinates Xf2 and Xf3 and an arc length Xd described later and illustrated in FIG. 9 actually denote lengths of one surface of the first panel P1. Coordinates Xr2 and Xr3 actually denote lengths of one surface of the second panel P2. In FIG. 9, these dimensions are illustrated at locations away from the one surface of the first panel P1 and the one surface of the second panel P2, and do not necessarily exactly correspond to the lengths of the one surface of the first panel P1 and the one surface of the second panel P2. However, the dimensions need to be illustrated in this manner for convenience of distinction of the drawing elements, and the exact lengths of the arrows have no technical meaning.

The first and the second panels P1 and P2 illustrated in FIG. 9 have the flat surface portion PA3 along the plane orthogonal to the Z-direction within a region from the one end P0 to a boundary coordinate Pt. The one end P0 is one end in the X-direction of each of the first and the second panels P1 and P2. The boundary coordinate Pt is located closer to the other end side than the one end P0 is, in the X-direction. The first and the second panels P1 and P2 illustrated in FIG. 9 have the concave portion PA1 and the convex portion PA2 on the other end side in the X-direction of the boundary coordinate Pt. Plate surfaces of the first and the second panels P1 and P2 in the concave portion PA1 have each a circular arc shape centered on a center point Q1 located on an emission side of the light from the light source device 50 toward the first panel P1. Plate surfaces of the first and the second panels P1 and P2 in the convex portion PA2 have each a circular arc shape centered on a center point Q2 located on the light source device 50 side of the second panel P2. The convex portion PA2 is located closer to the other end PE than the concave portion PA1 is. The other end PE is the other end in the X-direction of each of the first and the second panels P1 and P2. The concave portion PA1 is located between the flat surface portion PA3 and the convex portion PA2. As illustrated in FIG. 9, a boundary line between the concave portion PA1 and the convex portion PA2 overlaps a straight line Zb connecting the center point Q1 to the center point Q2 in the sectional view orthogonal to the Y-direction. A boundary line between the flat surface portion PA3 and the concave portion PA1 overlaps a straight line Za along the Z-direction passing through the center point Q1. The position in the X-direction where the straight line Za intersects the first and the second panels P1 and P2 is the boundary coordinate Pt described above.

When a pixel La that is the pixel 48 located in the flat surface portion PA3 is controlled to transmit light, the blurring processing is applied to a portion around a dimming pixel Ba that is a dimming pixel 148 transmitting light having an optical axis that coincides with an optical axis LLa of the light that is emitted from the light source device 50 and passes through the pixel La. A coordinate Xf1 denotes the coordinate of the pixel La on the first panel P1. A coordinate Xr1 denotes the coordinate of the dimming pixel Ba on the second panel P2. The coordinate Xf1 is a coordinate of the first panel P1 with respect to the one end P0 serving as the origin. That is, the coordinate Xf1 is a coordinate in the X-direction of the pixel 48 included in the flat surface portion PA3 among the pixels 48 each controlled so as to transmit light in accordance with a pixel signal given to the pixel 48 based on the input signal IP. The coordinate Xr1 is a coordinate of the second panel P2 with respect to the one end P0 serving as the origin. The coordinate Xf1 is equal to the coordinate Xr1. Thus, in FIG. 9, Expression (1) below holds. In other words, within the region of the flat surface portion PA3, the position of the pixel 48 that is controlled so as to transmit light in accordance with the pixel signal given to the pixel 48 based on the input signal IP overlaps the position of the dimming pixel 148 transmitting light having an optical axis that coincides with the optical axis of light passing through the pixel 48 controlled so as to transmit the light, in the plan view.

$$Xf1 = Xr1 \quad (1)$$

The curvature of the first panel P1 in the concave portion PA1 corresponds to a radius Rfd of the circular arc drawn around the center point Q1 by the first panel P1. The radius Rfd is equal to the distance between the center point Q1 and the first panel P1 in the concave portion PA1. The radius Rfd is determined in advance as a design item of the first panel P1.

The curvature of the second panel P2 in the concave portion PA1 corresponds to a radius Rrd of the circular arc drawn around the center point Q1 by the second panel P2. The radius Rrd is equal to the distance between the center point Q1 and the second panel P2 in the concave portion PA1. The relation between the radius Rrd and the radius Rfd is a relation that satisfies Expression (2) below. G denotes the distance between the one surface of the first panel P1 and the one surface of the second panel P2. The one surface of the first panel P1 is one of the plate surfaces of the first panel P1 facing the center point Q1. The one surface of the second panel P2 is one of the plate surfaces of the second panel P2 facing the first panel P1. G is determined in advance as a design item of the display device 1. Therefore, it can be said that the radius Rrd is also determined in advance as a design item of the second panel P2.

$$Rrd = Rfd + G \qquad (2)$$

When a pixel Lb that is the pixel 48 located in the concave portion PA1 is controlled to transmit light, the blurring processing is applied to a portion around a dimming pixel Bb that is a dimming pixel 148 transmitting light having an optical axis that coincides with an optical axis LLb of the light that is emitted from the light source device 50 and passes through the pixel Lb. The coordinate Xf2 denotes the coordinate of the pixel Lb on the first panel P1. The coordinate Xr2 denotes the coordinate of the dimming pixel Bb on the second panel P2. The coordinate Xf2 is a coordinate of the first panel P1 with respect to the one end P0 serving as the origin. That is, the coordinate Xf2 is a coordinate in the X-direction of the pixel 48 included in the concave portion PA1 among the pixels 48 each controlled so as to transmit light in accordance with the pixel signal given to the pixel 48 based on the input signal IP. The coordinate Xr2 is a coordinate of the second panel P2 with respect to the one end P0 serving as the origin. An angle θ1 formed by the straight line Za and the optical axis LLb can be expressed as Expression (3) below. π denotes the ratio of the circumference of a circle to the diameter thereof. Xt denotes the width in the X-direction of the flat surface portion PA3. The term "width Xt" refers to a matter denoted as Xt in Expression (3) and other expressions. The width Xt is determined in advance as a design item of the first panel P1.

$$\theta 1 = \{(Xf2 - Xt)/(2\pi \times Rfd)\} \times 360 \qquad (3)$$

Based on the angle θ1 obtained by Expression (3) above, the coordinate Xr2 is derived by Expression (4) below.

$$Xr2 = Xt + \{2\pi \times (\theta 1/360) \times Rrd\} \qquad (4)$$

An angle θ2 corresponding to the angular range of the concave portion PA1 centered on the center point Q1 is determined in advance as a design item of the display device 1, and can be expressed as Expression (5) below. Xd in Expression (5) denotes the length of the circular arc drawn by the one surface of the first panel P1 in the concave portion PA1. Xd is determined in advance as a design item of the display device 1.

$$\theta 2 = \{Xd/(2\pi \times Rfd)\} \times 360 \qquad (5)$$

The curvature of the first panel P1 in the convex portion PA2 corresponds to a radius Rfp of the circular arc drawn around the center point Q2 by the first panel P1. The radius Rfp is equal to the distance between the center point Q2 and the one surface of the first panel P1 in the convex portion PA2. The radius Rfp is determined in advance as a design item of the first panel P1.

The curvature of the second panel P2 in the convex portion PA2 corresponds to a radius Rrp of the circular arc drawn around the center point Q2 by the second panel P2. The radius Rrp is equal to the distance between the center point Q2 and the one surface of the second panel P2 in the convex portion PA2. The relation between the radius Rrd and the radius Rfd is a relation that satisfies Expression (6) below. It can be said that the radius Rrp is also determined in advance as a design item of the second panel P2.

$$Rrp = Rfp - G \qquad (6)$$

When a pixel Lc that is the pixel 48 located in the convex portion PA2 is controlled to transmit light, the blurring processing is applied to a portion around a dimming pixel Bc that is a dimming pixel 148 transmitting light having an optical axis that coincides with an optical axis LLc of the light that is emitted from the light source device 50 and passes through the pixel Lc. The coordinate Xf3 denotes the coordinate of the pixel Lc on the first panel P1. The coordinate Xr3 denotes the coordinate of the dimming pixel Bc on the second panel P2. The coordinate Xf3 is a coordinate of the first panel P1 with respect to the one end P0 serving as the origin. That is, the coordinate Xf3 is a coordinate in the X-direction of the pixel 48 included in the convex portion PA2 among the pixels 48 each controlled so as to transmit light in response to the pixel signal given to the pixel 48 based on the input signal IP. The coordinate Xr3 is a coordinate of the second panel P2 with respect to the one end P0 serving as the origin. An angle θ3 formed by the straight line Zb and the optical axis LLc can be expressed as Expression (7) below.

$$\theta 3 = [\{Xf3 - (Xt + Xd)\}/2\pi \times Rfp] \times 360 \qquad (7)$$

Based on the angle θ3 obtained by Expression (7) above, the coordinate Xr3 is derived by Expression (8) below.

$$Xr3 = Xt + \{2\pi \times (\theta 2/360) \times Rrd\} + \{2\pi \times (\theta 3/360) \times Rrp\} \qquad (8)$$

The coordinates of the pixels 48 (for example, the pixels La, Lb, and Lc) that are controlled to transmit light on the first panel P1 are determined in accordance with the pixel signal given to each of the pixels 48 based on the input signal IP received by the display device 1. The X-coordinates of the dimming pixels 148 (for example, the dimming pixels Ba, Bb, and Bc) transmitting light having optical axes that coincide with the optical axes (for example, the optical axes LLa, LLb, and LLc) of light passing through the pixels 48 controlled to transmit light are derived based on Expressions (1) to (8) above and the description regarding these expressions. In the embodiment, the coordinates in the Y-direction are common between the pixels 48 and the dimming pixels 148. The thus derived blurring region for each of the dimming pixels 148 transmitting light having optical axes that coincide with the optical axes of light passing through the pixels 48 controlled to transmit light corresponds to the curvature of the second panel P2 where each of the dimming pixels 148 is located. The derivation of the X-coordinates of the dimming pixels 148 based on Expressions (1) to (8) merely corresponds to the configuration example illustrated in FIG. 9. The present disclosure does not limit the shapes of the first and the second panels P1 and P2 and the expressions for deriving the X-coordinates of the dimming pixels 148 that can be employed in the embodiment according to the present disclosure. For example, when the flat surface portion PA3 is not provided and most or all of the first and the second panels P1 and P2 are curved, Xt is eliminated from Expressions (3), (4), (7), and (8). In this case, Xt only needs to be set to zero if Expressions (3), (4), (7), and (8) are applied as they are. Even when the flat surface portion PA3 is not provided, the curved surfaces assumed in the present disclosure, such as those of the concave portion PA1 and the convex portion PA2, are not curved in both the X- and Y-directions, but are curved in one of the X- and Y-directions (for example, the X-direction) and extend along the other direction (for example, the Y-direction). Therefore, the plate surfaces of the first panel P1 and the plate surface of the second panel P2 may each include a linear axis in at least one direction.

A case will be considered where two pixels 48 on a curved surface are controlled to transmit light. For example, a case is assumed where the pixels 48 that are controlled to transmit light are located in two positions in the concave portion PA1, and the two positions are the position of the pixel Lb and a position pointed by the distal end of the radius Rfd. In this case, each of the two positions, that is, the position of the dimming pixel Bb and the position pointed by the distal end of the radius Rrd is set as a position of the dimming pixel 148 that serves as the center of a predetermined region to which the blurring region is applied (refer to the blurring region BLU in FIG. 7). The first panel P1 in the concave portion PA1 is located on the inside diameter side of the second panel P2 in the concave portion PA1 centered on the center point Q1. Therefore, in the concave portion PA1, the curvature of the first panel P1 is greater than that of the second panel P2. That is, such a relation of the curvature indicates that the distance between the position of the dimming pixel Bb and the position pointed by the distal end of the radius Rrd is longer than the distance between the position of the pixel Lb and the position pointed by the distal end of the radius Rfd. Thus, in a concave portion such as the concave portion PA1, when the two pixels 48 that are controlled to transmit light in the first panel P1 are located in the concave portion, the distance between the centers of the two dimming pixel 148 to which the blurring processing is applied corresponding to the two pixels 48 is longer than the distance between the two pixels 48. The magnitude relation of the above-described distances holds in either of a case where the distance is interpreted as a distance that can be represented as a chord linearly connecting the two pixels 48 or the two dimming pixel 148 to each other, or a case where the distance is interpreted as an arc-shaped distance along the curved surface drawn by the first panel P1 or the second panel P2.

A case is also assumed where the pixels 48 that are controlled to transmit light are located in two positions in the convex portion PA2, and the two positions are the position of the pixel Lc and a position pointed by the distal end of the radius Rfp. In this case, each of the two positions, that is, the position of the dimming pixel Bc and the position pointed by the distal end of the radius Rrp is set as a position of the dimming pixel 148 that serves as the center of the predetermined region to which the blurring region is applied (refer to the blurring region BLU in FIG. 7). The first panel P1 in the convex portion PA2 is located on the outside diameter side of the second panel P2 in the convex portion PA2 centered on the center point Q2. Therefore, in the convex portion PA2, the curvature of the first panel P1 is smaller than that of the second panel P2. That is, such a relation of the curvature indicates that the distance between the position of the dimming pixel Bc and the position pointed by the distal end of the radius Rrp is shorter than the distance between the position of the pixel Lc and the position pointed by the distal end of the radius Rfp. Thus, in a convex portion such as the convex portion PA2, when the two pixels 48 that are controlled to transmit light in the first panel P1 are located in the convex portion, the distance between the centers of the two dimming pixel 148 to which the blurring processing is applied corresponding to the two pixels 48 is shorter than the distance between the two pixels 48. The magnitude relation of the above-described distances holds in either of a case where the distance is interpreted as a distance that can be represented as a chord linearly connecting the two pixels 48 or the two dimming pixel 148 to each other, or a case where the distance is interpreted as an arc-shaped distance along the curved surface drawn by the first panel P1 or the second panel P2.

Figure 10:
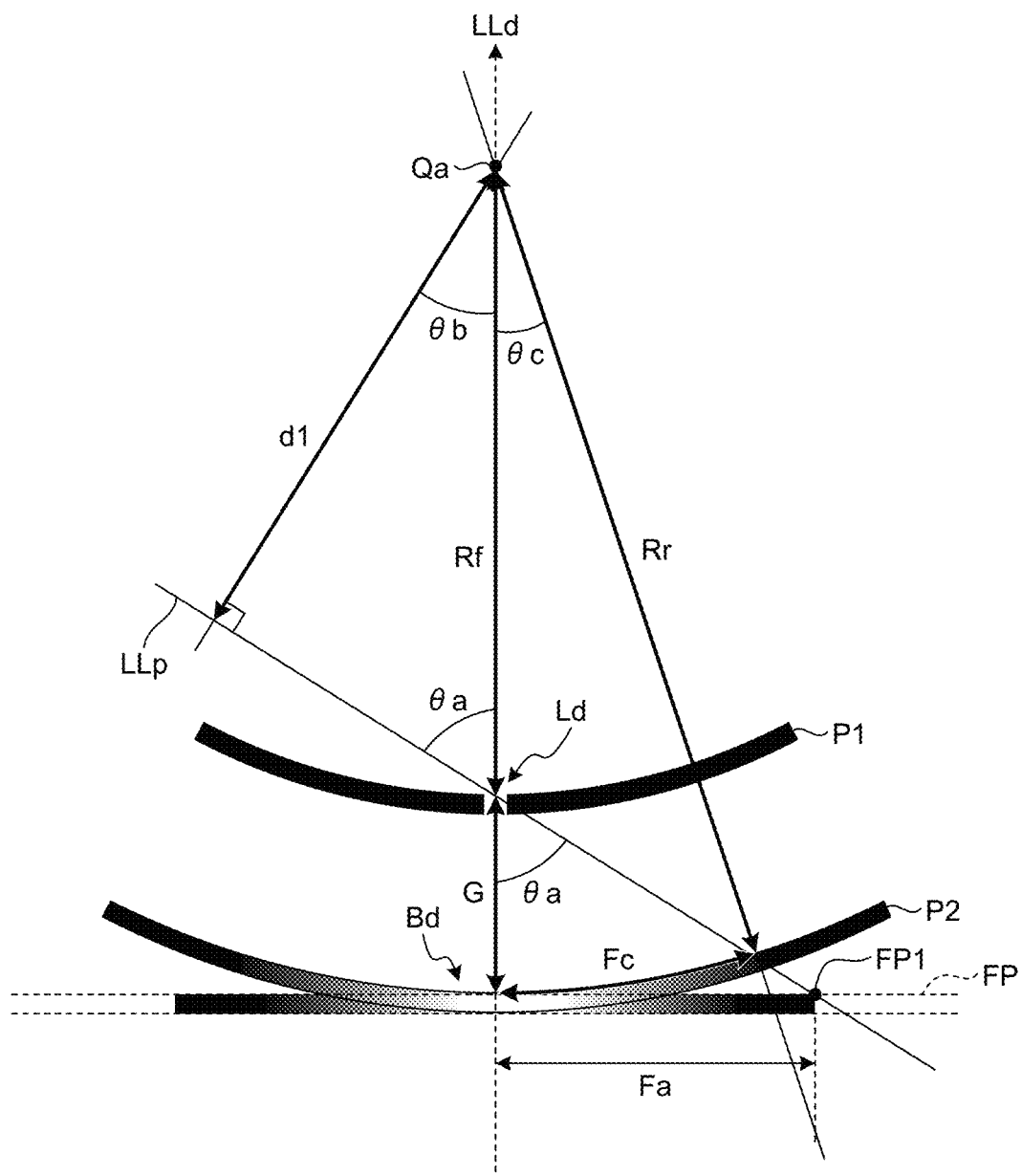
FIG. 10 is a diagram illustrating a matter related to a method for deriving a blurring region on a curved surface where the first panel looks recessed to a user in the same manner as a concave portion.
Figure 11:
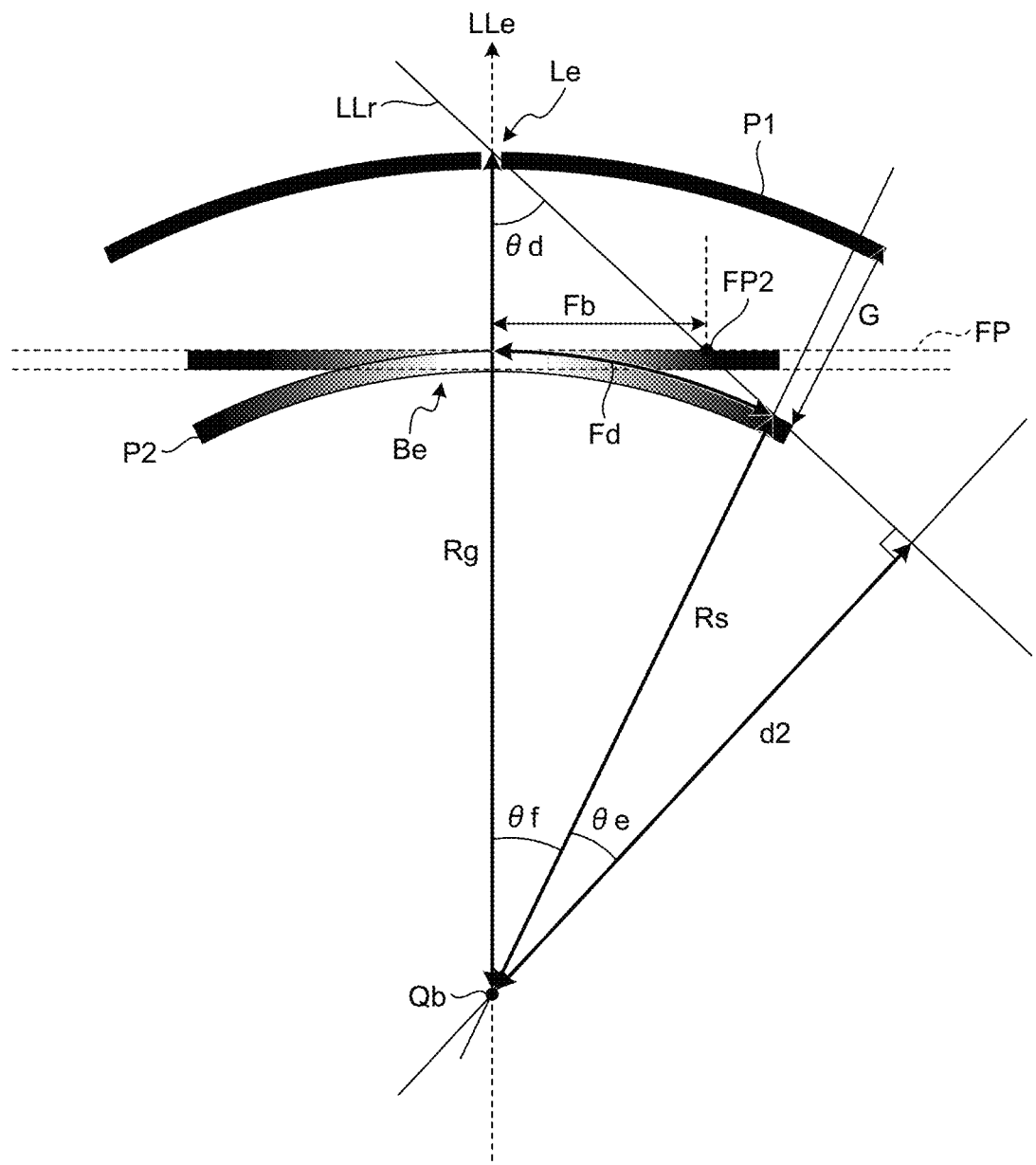
FIG. 11 is a diagram illustrating a matter related to a method for deriving the blurring region on a curved surface where the first panel looks raised to the user in the same manner as a convex portion.

The following describes a method for deriving the blurring region corresponding to the curvature of the second panel P2 with reference to FIGS. 10 and 11. FIG. 10 is a diagram illustrating a matter related to the method for deriving the blurring region on the curved surface where the first panel P1 looks recessed to the user in the same manner as the concave portion PA1. FIGS. 10 and 11 are sectional views obtained by viewing the same section as that of FIG. 9 explained above from the front.

First, a pixel Ld and a dimming pixel Bd are identified based on the description with reference to FIG. 9 given above. The pixel Ld is the pixel 48 that is controlled to transmit light, and the dimming pixel Bd is a dimming pixel 148 transmitting light having an optical axis that coincides with the optical axis of the light passing through the pixel Ld. FIG. 10 illustrates, as a radius Rf, a line segment that is a line segment representing the radius of an arc drawn by the one surface of the first panel P1 and that traces an optical axis LLd described later. FIG. 10 also illustrates a gap G in a position tracing the optical axis LLd.

Then, a blurring region Fa is identified when assuming that the dimming panel including the dimming pixel Bd is a flat panel FP along a plane orthogonal to the optical axis of the dimming pixel Bd. The entire blurring region extends in predetermined directions along a plate surface of the flat panel FP from the dimming pixel Bd serving as the center. The blurring region Fa herein refers to one of regions obtained by halving the blurring region in a predetermined direction at the dimming pixel Bd as the center in the entire blurring region. That is, in the entire blurring region of the flat panel FP, the two blurring regions Fa are arranged in the predetermined direction with the dimming pixel Bd interposed therebetween. The method for identifying the blurring region Fa will be described later. Hereinafter, the term "one surface of the flat panel FP" refers to one of the plate surfaces of the flat panel FP facing the first panel P1.

An angle θa denotes an acute angle formed by a first straight line LLd and a second straight line LLp at the center point of the pixel Ld on the one surface side of the first panel P1. The optical axis LLd is a straight line that traces the optical axis of the pixel Ld through the center point. The second straight line LLp is a straight line that connects a point FP1 to the center point. The point FP1 is a point on the one surface side of the flat panel FP and is a point farthest from the pixel Ld within a region in the flat panel FP serving as the blurring region Fa. The angle θa can be expressed as Expression (9) below.

$$\theta a = \tan^{-1}(Fa/G) \qquad (9)$$

A distance d1 between the second straight line LLp described above and a center point Qa can be expressed as Expression (10) below. The center point Qa is the center point of the circular arcs, similar to the center point Q1 in FIG. 9, drawn by the first and the second panels P1 and P2, where the first panel P1 looks recessed to the user. A line segment indicating the distance d1 can be represented as a line segment that is orthogonal to the second straight line LLp and has one end at the center point Qa, as illustrated in FIG. 10.

$$d1 = Rf \times \sin(\theta a) \tag{10}$$

An angle $\theta b$ denotes an acute angle formed by the optical axis LLd and the line segment indicating the distance d1 described above. The angle $\theta b$ can be expressed as Expression (11) below.

$$\theta b = \cos^{-1}(d1/Rf) \tag{11}$$

The length of a line segment Rr connecting the center point Qa to the point FP1 can be expressed as Expression (12) below.

$$Rr = Rf + G \tag{12}$$

An angle $\theta c$ denotes an acute angle formed by the radius Rf and the line segment Rr. The angle $\theta c$ can be expressed as Expression (13) below.

$$\theta c = (\theta c + \theta b) - \theta b = \cos^{-1}(d1/Rr) - \theta b \tag{13}$$

A blurring region Fc of the second panel P2 with respect to the dimming pixel Bd can be expressed as Expression (14) below. The entire blurring region extends in predetermined directions along an arc-shaped plate surface of the second panel P2 from the dimming pixel Bd serving as the center. The blurring region Fc herein refers to one of regions obtained by halving the arc-shaped blurring region at the dimming pixel Bd as the center in the entire blurring region. That is, in the entire blurring region of the second panel P2, the two blurring regions Fc are arranged in the predetermined direction with the dimming pixel Bd interposed therebetween.

$$Fc = 2\pi(\theta c/360)Rr \tag{14}$$

As described with reference to FIG. 10, processing of deriving the blurring region Fc of the second panel P2 is applied to the dimming pixel Bd transmitting light having an optical axis that coincides with the optical axis of light passing through the pixel Ld. In the processing, the angle $\theta a$, the distance d1, the angle $\theta b$, the line segment Rr, and the angle $\theta c$ are derived from the blurring region Fa, and then the blurring region Fc is derived. The blurring region Fa is identified when assuming that the dimming pixel Bd is located on the flat panel FP orthogonal to the optical axis.

FIG. 11 is a diagram illustrating a matter related to the method for deriving the blurring region on the curved surface where the first panel P1 looks raised to the user in the same manner as the convex portion PA2.

First, a pixel Le and a dimming pixel Be are identified based on the description with reference to FIG. 9 given above. The pixel Le is the pixel 48 that is controlled to transmit light, and the dimming pixel Be is a dimming pixel 148 transmitting light having an optical axis that coincides with the optical axis of light passing through the pixel Le. FIG. 11 illustrates, as a line segment Rg, a line segment that is a line segment representing the radius of an arc drawn by the one surface of the first panel P1 and that traces an optical axis LLe described later.

Then, a blurring region Fb is identified when assuming that the dimming panel including the dimming pixel Be is the flat panel FP along a plane orthogonal to the optical axis of the dimming pixel Be. The entire blurring region extends in predetermined directions along the plate surface of the flat panel FP from the dimming pixel Be serving as the center. The blurring region Fb herein refers to one of regions obtained by halving the blurring region in a predetermined direction at the dimming pixel Be as the center in the entire blurring region. That is, in the entire blurring region of the flat panel FP, the two blurring regions Fb are arranged in the predetermined direction with the dimming pixel Be interposed therebetween. The method for identifying the blurring region Fb will be described later. When the gap G between the panels is the same between FIGS. 10 and 11, the blurring region is the same therebetween when the panels are flat. That is, when the gap G between panels is the same, the blurring region Fa illustrated in FIG. 10 is the same as the blurring region Fb illustrated in FIG. 11. When the gap G between panels is the same, the angle $\theta a$ illustrated in FIG. 10 is the same as an angle $\theta d$ illustrated in FIG. 11.

The angle $\theta d$ denotes an acute angle formed by a third straight line LLe and a fourth straight line LLr at the center point of the pixel Le on the one surface side of the first panel P1. The optical axis LLe is a straight line that traces the optical axis of the pixel Le through the center point. The fourth straight line LLr is a straight line that connects a point FP2 to the center point. The point FP2 is a point on the one surface side of the flat panel FP and is a point farthest from the pixel Le within a region in the flat panel FP serving as the blurring region Fb. The angle $\theta d$ can be expressed as Expression (15) below.

$$\theta d = \tan^{-1}(Fb/G) \tag{15}$$

A distance d2 between the fourth straight line LLr described above and a center point Qb can be expressed as Expression (16) below. The center point Qb is the center point of the circular arcs, similar to the center point Q2 in FIG. 9, drawn by the first and the second panels P1 and P2, where the first panel P1 looks raised to the user. A line segment indicating the distance d2 can be represented as a line segment that is orthogonal to the fourth straight line LLr and has one end at the center point Qb, as illustrated in FIG. 11.

$$d2 = Rg \times \sin(\theta d) \tag{16}$$

The length of a line segment Rs connecting the center point Qb to the point FP2 can be expressed as Expression (17) below.

$$Rs = Rf - G \tag{17}$$

An angle $\theta e$ denotes an acute angle formed by the line segment Rs and the line segment indicating the distance d2 described above. The angle $\theta e$ can be expressed as Expression (18) below.

$$\theta e = \cos^{-1}(d2/Rs) \tag{18}$$

An angle $\theta f$ denotes an acute angle formed by the optical axis LLe and the line segment Rs. The angle $\theta f$ can be expressed as Expression (19) below.

$$\theta f = (\theta f + \theta e) - \theta e = \cos^{-1}(d2/Rg) - \theta e \tag{19}$$

A blurring region Fd of the second panel P2 with respect to the dimming pixel Be can be expressed as Expression (20) below. The entire blurring region extends in predetermined directions along an arc-shaped plate surface of the second panel P2 from the dimming pixel Be serving as the center. The blurring region Fd herein refers to one of regions obtained by halving the arc-shaped blurring region at the dimming pixel Be as the center in the entire blurring region.

That is, in the entire blurring region of the second panel P2, the two blurring regions Fd are arranged in the predetermined direction with the dimming pixel Be interposed therebetween.

$$Fd=2\pi(\theta f/360)Rs \quad (20)$$

As described with reference to FIG. 11, processing of deriving the blurring region Fd of the second panel P2 is applied to the dimming pixel Be transmitting light having an optical axis that coincides with the optical axis of light passing through the pixel Le. In the processing, the angle θd, the distance d2, the line segment Rs, the angle θe, and the angle θf are derived from the blurring region Fb, and then the blurring region Fd is derived. The blurring region Fb is identified when assuming that the dimming pixel Be is located on the flat panel FP orthogonal to the optical axis.

The spatial processor 12 (refer to FIG. 6) performs the processing described with reference to FIGS. 9, 10, and 11.

Figure 12:
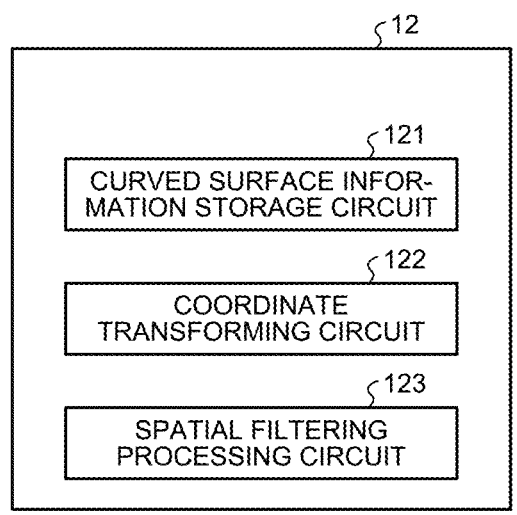
FIG. 12 is a block diagram illustrating a functional configuration of a spatial processor.

FIG. 12 is a block diagram illustrating a functional configuration of the spatial processor 12. The spatial processor 12 includes a curved surface information storage circuit 121, a coordinate transforming circuit 122, and a spatial filtering processing circuit 123.

The curved surface information storage circuit 121 holds the information indicating the various parameters described above that are assumed to be determined in advance as the design items. Specifically, the curved surface information storage circuit 121 holds the radius Rfd (radius Rf), the radius Rrd (line segment Rr), the gap G, the width Xt, the arc length Xd, the angle θ2, the radius Rfp (line segment Rg), and the radius Rrp (line segment Rs) described above. The curved surface information storage circuit 121 also holds static information that does not dynamically change depending on the input signal IP, such as the position of the center point Q1 (center point Qa) in the concave portion PA1, the position of the center point Q2 (center point Qb) in the convex portion PA2, and the angle of the circular arcs drawn around the center point Q2 by the first and the second panels P1 and P2 in the convex portion PA2, among the items described with reference to FIGS. 9 to 11.

Based on the description given above with reference to FIG. 9, the coordinate transforming circuit 122 performs processing to transform the coordinates of the pixels 48 (for example, the pixels La, Lb, and Lc) that are controlled to transmit light in accordance with the input signal IP into the coordinates of the dimming pixels 148 (for example, the dimming pixels Ba, Bb, and Bc) transmitting light having optical axes that coincide with the optical axes of light passing through the pixels 48. Specifically, the coordinate transforming circuit 122 derives the coordinates of the dimming pixels 148 (for example, the dimming pixels Ba, Bb, and Bc) from the coordinates of pixels 48 (for example, the pixels La, Lb, and Lc) based on Expressions (1) to (8) above.

The spatial filtering processing circuit 123 derives the blurring region of the dimming pixels 148 based on the description with reference to FIGS. 10 and 11 given above.

A blurring region (standard blurring region) is determined in advance for a case, such as the case of the blurring region Fa (refer to FIG. 10) or the case of the blurring region Fb (refer to FIG. 11) described above, where the dimming pixel 148 serving as the center of the blurring region is located on the planar second panel P2 such as the flat panel FP. Thus, the blurring region of the dimming pixel Ba (refer to FIG. 9) described with reference to FIG. 9 is determined in advance as the standard blurring region.

The standard blurring region is determined depending on the optical characteristics of the display panel 30, such as the viewing angle characteristics of the display panel 30, as in the case of the "spatial processing" of the embodiment described with reference to FIG. 7. To give a specific example, the blurring region Fa (refer to FIG. 10) and the blurring region Fb (refer to FIG. 11) are determined such that the angles such as the angle θa (refer to FIG. 10) and the angle θd (refer to FIG. 10) described above correspond to the viewing angle (horizontal viewing angle or vertical viewing angle) of the display panel 30. The size of the blurring region Fa corresponding to the angle θa and the size of the blurring region Fb corresponding to the angle θd correspond to the gap G. Under the condition that the angle θa and the angle θd are determined in advance according to the viewing angle characteristics of the display panel 30, the blurring region Fa and the blurring region Fb are larger as the gap G is larger.

To give a more specific example, the dimming pixel 148 transmitting light having an optical axis that coincides with the optical axis of light passing through the pixel 48 to be controlled to transmit light in accordance with the input signal IP, is controlled to transmit light at the highest transmittance (100%). According to the standard blurring region determined in advance, the light transmittance of the n-th dimming pixel 148 from the dimming pixel 148 is controlled to be {100×(m−n)/m}%, and the light transmittance of the m-th dimming pixel 148 from the dimming pixel 148 is controlled to be 0%. n and m are natural numbers. A relation n≤m holds. The n-th dimming pixel 148 from the dimming pixel 148 refers to a dimming pixel 148 arranged in the X-direction with respect to the dimming pixel 148 and located in a position with (n−1) of the other dimming pixels 148 interposed between the dimming pixel 148 and the n-th dimming pixel 148. The light transmittance of dimming pixels 148 arranged in the Y-direction with respect to the dimming pixel 148 is also set in advance based on the same idea. The light transmittance of dimming pixels 148 arranged in an oblique direction with respect to the dimming pixel 148 is also set in advance according to the optical characteristics of the display panel 30, such as the viewing angle characteristics of the display panel 30.

In the more specific example described above, the distance between the center in the X-direction of the dimming pixel 148 transmitting light having an optical axis that coincides with the optical axis of light passing through the pixel 48 to be controlled to transmit light in accordance with the input signal IP and the center in the X-direction of the m-th dimming pixel 148 corresponds to each of the blurring region Fa and the blurring region Fb described above. The spatial filtering processing circuit 123 controls the light transmittance of the dimming pixels 148 located within the region of the blurring region Fc based on the ratio between the above-described blurring region Fa and the blurring region Fc derived based on the description with reference to FIG. 10 given above. An example is assumed where m=10. In this case, the transmittance of the other dimming pixels 148 arranged in the X-direction with respect to the dimming pixel 148 (hereinafter, referred to as the first dimming pixel 148) transmitting light having an optical axis that coincides with the optical axis of light passing through the pixel 48 to be controlled to transmit light in accordance with the input signal IP decreases to 90%, 80%, 70%, 60%, 50%, 40%, 30%, 20%, 10%, and 0% as the position moves away one by one from the first dimming pixel 148. Assuming that Fa:Fc is 2:1, the transmittance of the dimming pixels 148 included in the blurring region Fc decreases to 80%, 60%, 40%, 20%, and 0% as the position moves away one by one from the first dimming pixel 148. Based on the same idea, the spatial filtering processing circuit 123 controls the light transmittance of the dimming pixels 148 located within the blurring region Fd based on the ratio between the blurring region Fb and the blurring region Fd derived based on the description with reference to FIG. 10 given above.

As illustrated in FIG. 10, when the blurring region Fa is compared with the blurring region Fc, the blurring region Fc is a smaller region than the blurring region Fa. Thus, when the curved surfaces of the display panel 30 and the dimming panel 80 are in a concave portion and the pixel Ld that is controlled to transmit light through the display panel 30 is located in the concave portion, the blurring region Fc generated corresponding to the pixel Ld is smaller than the blurring region Fa that is generated when the dimming panel 80 is assumed to be the planar flat panel FP. As illustrated in FIG. 11, when the blurring region Fb is compared with the blurring region Fd, the blurring region Fd is a larger region than the blurring region Fb. Thus, when the curved surfaces of the display panel 30 and the dimming panel 80 are in a convex portion and the pixel Le that is controlled to transmit light through the display panel 30 is located in the convex portion, the blurring region Fd generated corresponding to the pixel Le is larger than the blurring region Fb that is generated when the dimming panel 80 is assumed to be the planar flat panel FP.

Figure 13:
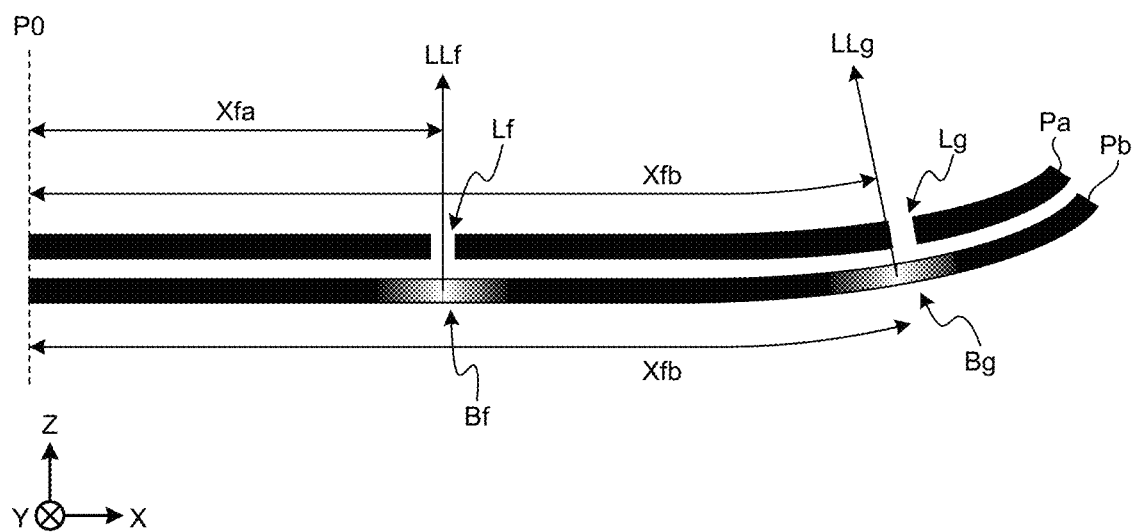
FIG. 13 is a schematic diagram illustrating a reference example having a concave portion.
Figure 14:
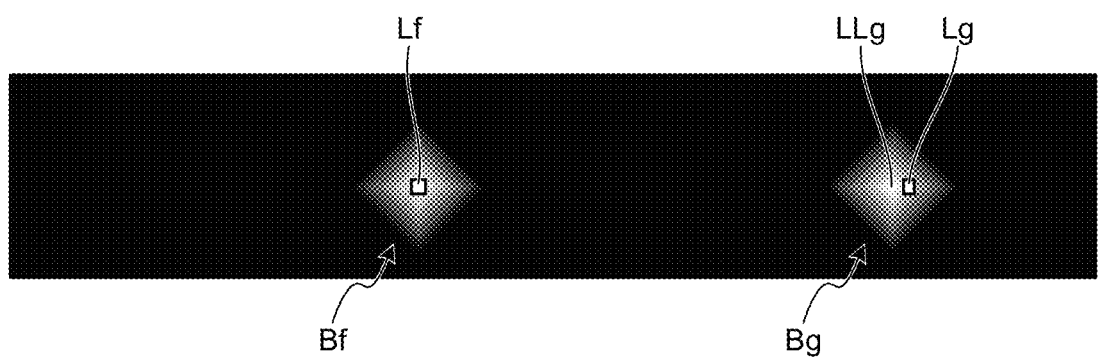
FIG. 14 is a plan view illustrating a relation between the position of each of the pixels that transmit light and the region of the blurring processing by a corresponding one of the dimming pixels in the reference example.

The following describes, with reference to FIGS. 13 and 14, a reference example where positional misalignment between the pixel of the curved display panel and the dimming pixel of the curved dimming panel is not taken into account, unlike in the embodiment.

FIG. 13 is a schematic diagram illustrating the reference example having a concave portion. A first panel Pa illustrated in FIG. 13 has the same configuration as that of the first panel P1, except that it has a curvature that looks concave to the user but no curvature that looks convex to the user. A second panel Pb illustrated in FIG. 13 has the same configuration as that of second panel P2, except in having a curvature along the first panel Pa.

A pixel Lf and a pixel Lg among the pixels 48 included in the first panel Pa illustrated in FIG. 13 are assumed to be controlled to transmit light. A region from the one end P0 to the pixel Lf includes only a flat surface orthogonal to the Z-direction. Therefore, by applying the blurring processing to a dimming pixel Bf at a coordinate obtained by applying a coordinate Xfa of the pixel Lf to the coordinate of the dimming pixel 148 included in the second panel Pb, the optical axis of the pixel Lf coincides with the optical axis of the dimming pixel Bf at an optical axis LLf. As a result, only in the case of the dimming pixel Bf, the effect of the blurring processing can also be obtained in the reference example in the same manner as in the embodiment.

In contrast, a region from the one end P0 to the pixel Lg includes a curved surface. As a result, if the blurring processing is applied to a dimming pixel Bg at a coordinate obtained by applying a coordinate Xfb of the pixel Lg to the coordinate of the dimming pixel 148 included in the second panel Pb, an optical axis LLg of the dimming pixel Bg is located in a position shifted from the center of the pixel Lg.

FIG. 14 is a plan view illustrating a relation between the position of each of the pixels Lf and Lg that transmit light and the region of the blurring processing by a corresponding one of the dimming pixels Bf and Bg in the reference example. As illustrated in FIG. 14, the center of pixel Lf coincides with the center of the dimming pixel Bf. In contrast, the optical axis LLg serving as the center of the dimming pixel Bg is shifted from the pixel Lg. With such a misaligned dimming pixel Bg, the effect of the blurring processing cannot be fully exerted on the pixel Lg. In this manner, in the reference example, the coordinate management corresponding to the curved surfaces of the first and the second panels Pa and Pb is not performed. As a result, the blurring processing cannot be properly performed on the curved surfaces.

In contrast, according to the embodiment, since the coordinate management and the derivation of the blurring region are performed corresponding to the curved surfaces of the first and the second panels P1 and P2 as described with reference to FIGS. 9 to 11, it is possible, regardless of the coordinate of the pixel 48 that is controlled to transmit light, to properly control the coordinate and the blurring region of the dimming pixel 148 transmitting light having an optical axis that coincides with the optical axis of light passing through the pixel 48.

The arithmetic expressions such as Expressions (1) to (20) described with reference to FIGS. 9 to 11 are only exemplary, and do not limit the mechanism of the derivation of the blurring region and the coordinate management. For example, on a concave surface such as the concave portion PA1 as compared with the flat first and second panels P1 and P2 (for example, the flat surface portion PA3 illustrated in FIG. 8) orthogonal to the Z-direction, the coordinate of the dimming pixel 148 on the second panel P2 transmitting light having an optical axis that coincides with the optical axis of light passing through the pixel 48 relative to the coordinate of the pixel 48 on the first panel P1 from the origin (for example, one end P0) and the blurring region centered on the dimming pixel 148 are set larger in the curved direction of the curved surface. In this case, the degrees of increase in the coordinate of the dimming pixel 148 on the second panel P2 and increase in the blurring region centered on the dimming pixel 148 can be controlled more appropriately, for example, by making the degrees correspond to the ratio between the curvature of the first panel P1 and the curvature of the second panel P2 on the concave surface. On a convex surface such as the convex portion PA2 as compared with the flat first and second panels P1 and P2 (for example, the flat surface portion PA3 illustrated in FIG. 8) orthogonal to the Z-direction, the coordinate of the dimming pixel 148 on the second panel P2 transmitting light having an optical axis that coincides with the optical axis of light passing through the pixel 48 relative to the coordinate of the pixel 48 on the first panel P1 from the origin (for example, one end P0) and the blurring region centered on the dimming pixel 148 are set smaller in the curved direction of the curved surface. In this case, the degrees of reduction in the coordinate of the dimming pixel 148 on the second panel P2 and reduction in the blurring region centered on the dimming pixel 148 can be controlled more appropriately, for example, by making the degrees correspond to the ratio between the curvature of the first panel P1 and the curvature of the second panel P2 on the convex surface. The above-described processes allow more appropriate light-transmission control by the second panel P2 than in the case of not dealing with, for example, the coordinate management for the curved surface, such as in the case of the reference example.

As described above, according to the embodiment, the display device 1 includes the first panel (first panel P1) including a plurality of pixels (pixels 48) and the second panel (second panel P2) having the plate surface provided substantially in parallel with the plate surface of the first panel. The plate surface of the first panel and the plate surface of the second panel each include a curved surface (for example, at least one of the concave portion PA1 and the convex portion PA2). The blurring processing is applied to the dimming pixel (dimming pixel 148) of the second panel facing the pixel that is controlled to transmit light through the first panel. In the blurring processing, based on the gradation value indicated by the pixel signal included in the externally received image signal (input signal IP), the dimming pixel (dimming pixels 148) arranged within the predetermined region (for example, the blurring region BLU illustrated in FIG. 7) located around the pixel (pixel 48) given the pixel signal is controlled to transmit light. When the curved surface is in a convex portion (for example, the convex portion PA2) and two pixels (pixels 48) that are controlled to transmit light through the first panel are located in the convex portion, the distance between the centers of the two predetermined regions to which the blurring processing is applied corresponding to the two pixels is smaller than the distance between the two pixels. The term "center of the predetermined region" refers to the center of the dimming pixel (dimming pixel 148) transmitting light having an optical axis that coincides with the optical axis of light passing through the pixel (pixel 48) that is controlled to transmit light. In the convex portion, the curvature of the first panel is smaller than that of the second panel. When the curved surface is in a concave portion (for example, the concave portion PA1) and the two pixels (pixels 48) that are controlled to transmit light through the first panel are located in the concave portion, the distance between the centers of the two predetermined regions to which the blurring processing is applied corresponding to the two pixels is larger than the distance between the two pixels. In the concave portion, the curvature of the first panel is larger than that of the second panel.

As a result, the position of the dimming pixel (dimming pixel 148) located at the center of the predetermined region to which the blurring processing is applied corresponds to the magnitude relation between the curvatures of the curved surfaces of the first panel (first panel P1) and the second panel (second panel P2). Thus, the light-transmitting position of the second panel (second panel P2) is made more appropriate.

The plate surface of the first panel (first panel P1) and the plate surface of the second panel (second panel P2) each include a flat surface. When the two pixels (pixels 48) that are controlled to transmit light through the first panel are located on the flat surface (for example, the flat surface portion PA3), the distance between the two pixels is equal to the distance between the centers of the two predetermined regions to which the blurring processing is applied corresponding to the two pixels.

According to the embodiment, the display device 1 includes the first panel (first panel P1) including a plurality of pixels (pixels 48) and the second panel (second panel P2) having the plate surface provided substantially in parallel with the plate surface of the first panel. The plate surface of the first panel and the plate surface of the second panel each include the curved surface (for example, at least one of the concave portion PA1 and the convex portion PA2) and the flat surface (for example, the flat surface portion PA3). The blurring processing is applied to the dimming pixel (dimming pixel 148) of the second panel facing the pixel that is controlled to transmit light through the first panel. In the blurring processing, based on the gradation value indicated by the pixel signal included in the externally received image signal (input signal IP), the dimming pixel (dimming pixels 148) arranged within the predetermined region (for example, the blurring region BLU illustrated in FIG. 7) located around the pixel (pixel 48) given the pixel signal is controlled to transmit light. When the curved surface is in a convex portion (for example, the convex portion PA2) and one of the two pixels (pixels 48) that are controlled to transmit light through the first panel is located in the convex portion while the other of the two pixels is located on the flat surface, a predetermined region (for example, the blurring region Fd illustrated in FIG. 11) facing the one of the two pixels is larger than a predetermined region (for example, the blurring region Fb illustrated in FIG. 11) facing the other of the two pixels, in the two predetermined regions to which the blurring processing is applied corresponding to the two pixels. When the curved surface is in a concave portion (for example, the concave portion PA1) and one the two pixels (pixels 48) that are controlled to transmit light through the first panel is located in the concave portion while the other of the two pixels is located on the flat surface, the predetermined region (for example, the blurring region Fc illustrated in FIG. 10) facing the one of the two pixels is smaller than the predetermined region (for example, the blurring region Fa illustrated in FIG. 10) facing the other of the two pixels, in the two predetermined regions to which the blurring processing is applied corresponding to the two pixels.

As a result, the predetermined regions to which the blurring processing is applied (for example, the blurring regions Fc and Fd) correspond to the magnitude relation between the curvatures of the curved surfaces of the first panel (first panel P1) and the second panel (second panel P2). Thus, the light-transmitting position of the second panel (second panel P2) is made more appropriate.

A signal obtained by applying the gamma correction in accordance with a predetermined gamma value to the image signal (input signal IP) is reflected in the output of the second panel (second panel P2). As a result, the degree of transmission of light can be appropriately controlled by the dimming pixels (dimming pixels 148) based on the gamma value.

A signal obtained by applying the gamma correction in accordance with the gamma value of the first panel to the image signal (input signal IP) is reflected in the output of the first panel (first panel P1). As a result, more appropriate display output can be performed in accordance with the gamma characteristics of the first panel.

The display device 1 includes the backlight (light source device 50) having the light-emitting surface (light-emitting surface LA) that emits the light from the second panel (second panel P2) side toward the first panel (first panel P1). The light-emitting surface is provided substantially in parallel with the plate surface of the second panel. This configuration allows the light to more evenly irradiate the first and the second panels.

The second panel (second panel P2) is a monochrome liquid crystal panel. As a result, the light transmittance through the second panel can be increased Each of the dimming pixels 148 may include one monochrome sub-pixel corresponding to the size and shape of the pixel 48 in the plan view, or may include a plurality of monochrome sub-pixels corresponding to the size, the shape, and the number of the sub-pixels 49 included in the pixel 48. Even when a plurality of sub-pixels are included, the monochrome sub-pixels included in each of the dimming pixels 148 are controlled to have the same degree of transmission of light. The degree of transmission of light is the degree of transmission of light determined by the blurring processing described above.

Other operational advantages accruing from the aspects described in the embodiment that are obvious from the description herein or that are appropriately conceivable by those skilled in the art will naturally be understood as accruing from the present disclosure.

What is claimed is:

1. A display device comprising:

a first panel comprising a plurality of pixels; and a second panel having a plate surface provided substantially in parallel with a plate surface of the first panel, wherein the plate surface of the first panel and the plate surface of the second panel each include a curved surface, blurring processing is configured to be applied to a dimming pixel of the second panel facing a pixel of the pixels that is controlled to transmit light through the first panel, in the blurring processing, based on a gradation value indicated by a pixel signal included in an externally received image signal, the dimming pixel arranged within a predetermined region located around a pixel of the pixels given the pixel signal is controlled to transmit light, when the curved surface is a convex portion, and a first pixel and a second pixel of the pixels that are controlled to transmit the light through the first panel are located in the convex portion, a distance between the first pixel and the second pixel is greater than a distance between:

a center of a first predetermined region to which the blurring processing is applied corresponding to the first pixel; and a center of a second predetermined region to which the blurring processing is applied corresponding to the second pixel, when the curved surface is a concave portion, and a third pixel and a fourth pixel of the pixels that are controlled to transmit the light through the first panel are located in the concave portion, a distance between the third pixel and the fourth pixel is less than a distance between:

a center of a third predetermined region to which the blurring processing is applied corresponding to the third pixel; and a center of a fourth predetermined region to which the blurring processing is applied corresponding to the fourth pixel, a curvature of the first panel is smaller than a curvature of the second panel in the convex portion, the curvature of the first panel is larger than the curvature of the second panel in the concave portion, the plate surface of the first panel and the plate surface of the second panel each include a flat surface, and when a fifth pixel and a sixth pixel of the pixels that are controlled to transmit the light through the first panel are located on the flat surface, a distance between the fifth pixel and the sixth pixel is equal to a distance between:

a center of a fifth predetermined region to which the blurring processing is applied corresponding to the fifth pixel; and a center of a sixth predetermined region to which the blurring processing is applied corresponding to the sixth pixel, when the third pixel is located in the concave portion while the fifth pixel is located on the flat surface, the third predetermined region facing the third pixel is set smaller than the fifth predetermined region facing the fifth pixel; and when the first pixel is located in the convex portion while the fifth pixel is located on the flat surface, the first predetermined region facing the first pixel is set larger than the fifth predetermined region facing the fifth pixel.

2. The display device according to claim 1, wherein a signal obtained by applying gamma correction in accordance with a predetermined gamma value to the image signal is reflected in an output of the second panel.

3. The display device according to claim 1, wherein a signal obtained by applying gamma correction in accordance with a gamma value of the first panel to the image signal is reflected in an output of the first panel.

4. The display device according to claim 1, further comprising a backlight that has a light-emitting surface configured to emit light from the second panel side toward the first panel, wherein the light-emitting surface is provided substantially in parallel with the plate surface of the second panel.

5. The display device according to claim 1, wherein the second panel is a monochrome liquid crystal panel.

* * * * *